(12) United States Patent
Remis et al.

(10) Patent No.: US 12,008,456 B2
(45) Date of Patent: Jun. 11, 2024

(54) METHODS, APPARATUS, SYSTEMS AND ARTICLES OF MANUFACTURE FOR PROVIDING QUERY SELECTION SYSTEMS

(71) Applicant: Intel Corporation, Santa Clara, CA (US)

(72) Inventors: Luis Carlos Maria Remis, Hillsboro, OR (US); Justin Gottschlich, Santa Clara, CA (US); Javier Sebastian Turek, Beaverton, OR (US); Ignacio Javier Alvarez, Portland, OR (US); David Israel Gonzalez Aguirre, Hillsboro, OR (US); Javier Felip Leon, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1103 days.

(21) Appl. No.: 16/457,413

(22) Filed: Jun. 28, 2019

(65) Prior Publication Data

US 2019/0325292 A1 Oct. 24, 2019

(51) Int. Cl.
*G06N 3/044* (2023.01)
*G06F 16/245* (2019.01)
(Continued)

(52) U.S. Cl.
CPC ........... *G06N 3/044* (2023.01); *G06F 16/245* (2019.01); *G06F 16/285* (2019.01); *G06F 16/9024* (2019.01); *G06N 3/08* (2013.01)

(58) Field of Classification Search
None
See application file for complete search history.

(56) References Cited

U.S. PATENT DOCUMENTS

2005/0132371 A1* 6/2005 Lopez-Estrada .... G06F 11/3452
714/E11.197
2008/0222093 A1* 9/2008 Fan .................... G06F 16/24545
(Continued)

OTHER PUBLICATIONS

"3 Steps To Training a Machine Learning Model." Published Sep. 28, 2020 by Pluralsight.com. Accessed Aug. 8, 2023 via the Internet Archive WayBack Machine at https://web.archive.org/web/20200928131755/https://www.pluralsight.com/blog/machine-learning/3-steps-train-machine-learning (Year: 2020).*

(Continued)

*Primary Examiner* — Alex Gofman
*Assistant Examiner* — Umar Mian
(74) *Attorney, Agent, or Firm* — Hanley, Flight & Zimmerman, LLC

(57) ABSTRACT

Methods, apparatus, systems and articles of manufacture for providing query selection systems are disclosed. An example query selection system includes a processor to: analyze a graph database; identify respective ones of objects associated with the graph database; obtain properties associated with the objects; identify common properties present in the respective ones of the objects; in response to determining the common properties present in the identified objects, output a list of the common properties corresponding to the respective ones of the objects; generate a table for the common properties and the respective ones of the objects; and populate the table with the common properties and the respective ones of the objects from the graph database to establish a relational database. The system further includes a machine learning model classifier to enable relational database query searching via the relational database.

25 Claims, 12 Drawing Sheets

(51) Int. Cl.
  *G06F 16/28* (2019.01)
  *G06F 16/901* (2019.01)
  *G06N 3/08* (2023.01)

(56) References Cited

U.S. PATENT DOCUMENTS

| | | | | |
|---|---|---|---|---|
| 2009/0193006 | A1* | 7/2009 | Herrnstadt | G06F 16/221 |
| | | | | 707/999.005 |
| 2014/0172914 | A1* | 6/2014 | Elnikety | G06F 16/9024 |
| | | | | 707/774 |
| 2014/0279837 | A1* | 9/2014 | Guo | G06F 16/217 |
| | | | | 707/603 |
| 2015/0169758 | A1* | 6/2015 | Assom | G06F 16/36 |
| | | | | 707/603 |
| 2016/0092584 | A1* | 3/2016 | Nigam | G06F 16/9024 |
| | | | | 707/798 |
| 2017/0017537 | A1* | 1/2017 | Razin | G06F 11/0709 |
| 2019/0095395 | A1* | 3/2019 | Piecko | G06F 16/903 |
| 2019/0286662 | A1* | 9/2019 | Yousfi | G06F 16/90335 |
| 2021/0173831 | A1* | 6/2021 | Crabtree | G06N 5/02 |

OTHER PUBLICATIONS

Garlapati, Harsha Vardhan. "The Role of Mathematics in Machine Learning." Published Jul. 13, 2023 by KnowledgeHut. Accessed Aug. 8, 2023 from https://www.knowledgehut.com/blog/data-science/importance-of-maths-in-machine-learning (Year: 2023).*

Bronson et al., "TAO: Facebook's Distributed Data Store for the Social Graph," (2013), 2013 USENIX Annual Technical Conference (USENIX ATC '13), USENIX Association, pp. 49-60, 12 pages.

Remis et al., "VDMS: Efficient Big-Visual-Data Access for Machine Learning Workloads," Workshop on Systems for Machine Learning and Open Source Softward at NIPS (2018), Montreal, Canada, 7 pages.

Ammar et al., "Experimental Analysis of Distributed Graph Systems," Proceedings of the VLDB Endowment, (2018) vol. 11, No. 10, pp. 1151-1164, 14 pages.

Plechawska-Wojcik et al., "Comparison of Relational, Document and Graph Databases in the Context of the Web Application Development," Information Systems Architecture and Technology: Proceedings of 36th International Conference on Information Systems Architecture and Technology—ISAT 2015—Part II, Advances in Intelligent Systems and Computing 430, Springer International Publishing Switzerland 2016, 11 pages.

Xia et al., "Explore Efficient Data Organization for Large Scale Graph Analytics and Storage," IEEE BigData '14, (2014), 10 pages.

Burckhardt, "Principles of Eventual Consistency," Foundations and Trends in Programming Languages, (2014) vol. 1, No. 1-2, 170 pages.

Mihail et al., "On Generating Graphs with Prescribed Vertex Degrees for Complex Network Modeling," (2012) College of Computing, Georgia Institue of Technology, 11 pages.

Gupta-Cledat et al., "Addressing the Dark Side of Vision Research: Storage," (2017) 9th USENIX Workshop on HotStorage, USENIX Association, 6 pages.

Zheng et al., "Question Answering Over Knowledge Graphs: Question Understanding Via Template Decomposition," (2018) Proceedings of the VLDB Endowment, vol. 11, No. 11, pp. 1373-1386, 14 pages.

Lissandrini et al., "X2Q: Your Personal Example-based Graph Explorer," (2018) Proceedings of the VLDB Endowment, vol. 11, No. 12, pp. 2026-2029, 4 pages.

Hochreiter et al., "Long Short-Term Memory," (1997) Neural Computation 9(8): pp. 1735-1780, 32 pages.

Mikolov et al., "Distributed Representations of Words and Phrases and their Compositionality," (2013), Advances in neural information processing systems, pp. 3111-3119, 9 pages.

Werbos, "Backpropagation through time: what it does and how to do it," (Oct. 1990), Proceedings of the IEEE, vol. 78, No. 10, pp. 1550-1560, 11 pages.

Batra et al. "Comparative Analysis of Relational and Graph Databases," (May 2012), International Journal of Soft Computing and Engineering (IJSCE), vol. 2, Issue 2, pp. 509-512, 4 pages.

Hady et al., "Platform Storage Performance with 3D XPoint Technology," (Sep. 2017), Proceedings of the IEEE, vol. 105, No. 9, pp. 1822-1833, 12 pages.

* cited by examiner

METHODS, APPARATUS, SYSTEMS AND ARTICLES OF MANUFACTURE FOR PROVIDING QUERY SELECTION SYSTEMS

FIELD OF THE DISCLOSURE

This disclosure relates generally to code development and, more particularly, to methods, apparatus, systems and articles of manufacture for providing query selection systems.

BACKGROUND

Applications executing on a platform, such as a personal computer (PC), server, tablet, etc. utilize particular data structures to facilitate data manipulation. To enable a user query, platforms often employ a single data model such as, for example, a graph model or relational model. For example, graph models enable interrogation of information from visual processing and relational databases enable interrogation of information by iterating over properties of objects represented as columns and rows in a table.

DETAILED DESCRIPTION

Figure 1:
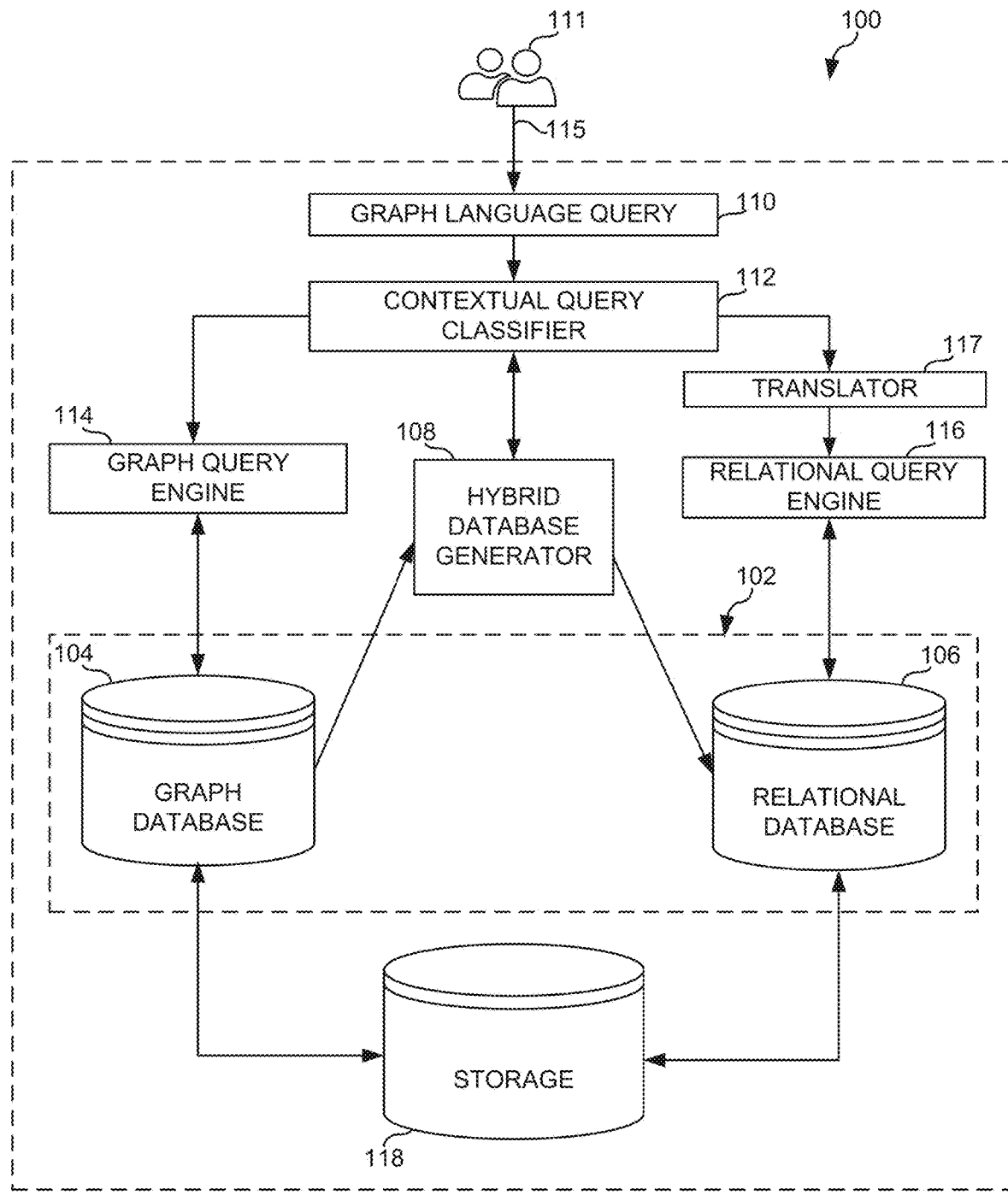
FIG. 1 is a block diagram of an example query selection system constructed in accordance with teachings of this disclosure for selecting between multiple query engines.

Utilizing and/or otherwise selecting a particular data structure affects a performance metric of an application executing on a platform. Performance metrics include, but are not limited to, an amount of memory consumed by the data structure, or a speed at which the data structure is capable of transferring (e.g., reading, writing) and/or modifying data, a number of computer processing unit (CPU) cycles consumed by particular memory operation(s), etc. For instance, performance metrics associated with an amount of memory being consumed by the application become important for circumstances in which the application operates on a device platform that has a finite amount of memory. On the other hand, performance metrics associated with a speed at which data can be transferred becomes important for circumstances in which the application processes relatively large quantities of data in real-time. In still other examples, an ordered list data structure type enables dataset retrieval to occur in a relatively fast manner, but that data structure type exhibits substantially slower element storage capabilities.

To enable interrogation of data, some platforms or electronic devices employ different types of databases to organize data in a searchable format. For example, some platforms employ a graph based database. Graphs typically are a natural representation of data or information that can be from visual processing. To extract insights or information from a graph database, a graph query language is often employed. Some example graph query languages are designed to be easily read and understood by users as they mimic the way a user intuitively describe queries when using whiteboard-like diagrams. Some example platforms employ a relational database. Relational databases represent data or information organized in table format (e.g., a table having columns and rows).

Graph databases have historically provided low performance when compared to relational databases. Because of the sequential nature of tables, relational databases are able to effectively leverage contiguous read and write access of rotational hard drives, often performing better than graph databases under such underlying hardware conditions. However, as new storage technologies (Solid State Drives, Intel Optane©, etc.) are reducing a latency gap between sequential and random accesses, graph databases are becoming more attractive for certain queries. From a storage point of view, access patterns in databases can be divided into two classifications: (1) a random-access pattern; and (2) a sequential pattern.

Random-access patterns include access to different properties of different objects through relationships. This is typical access to random portions of data. Some examples of these queries include, but are not limited to, "get a list of the best-sell products of the areas in a retail store which customer A has visited in the past," or "get a list of brain scan images corresponding to patients over 75 years old that received chemotherapy with drug X". These examples involve a random-access pattern because these types of queries require the exploration of relationships between objects. If the information is expressed using a relational model, different tables must be accessed in order to obtain the necessary information. For example, FIG. 8A illustrates a relational model (e.g., expressing relationships between objects).

Figure 8A:
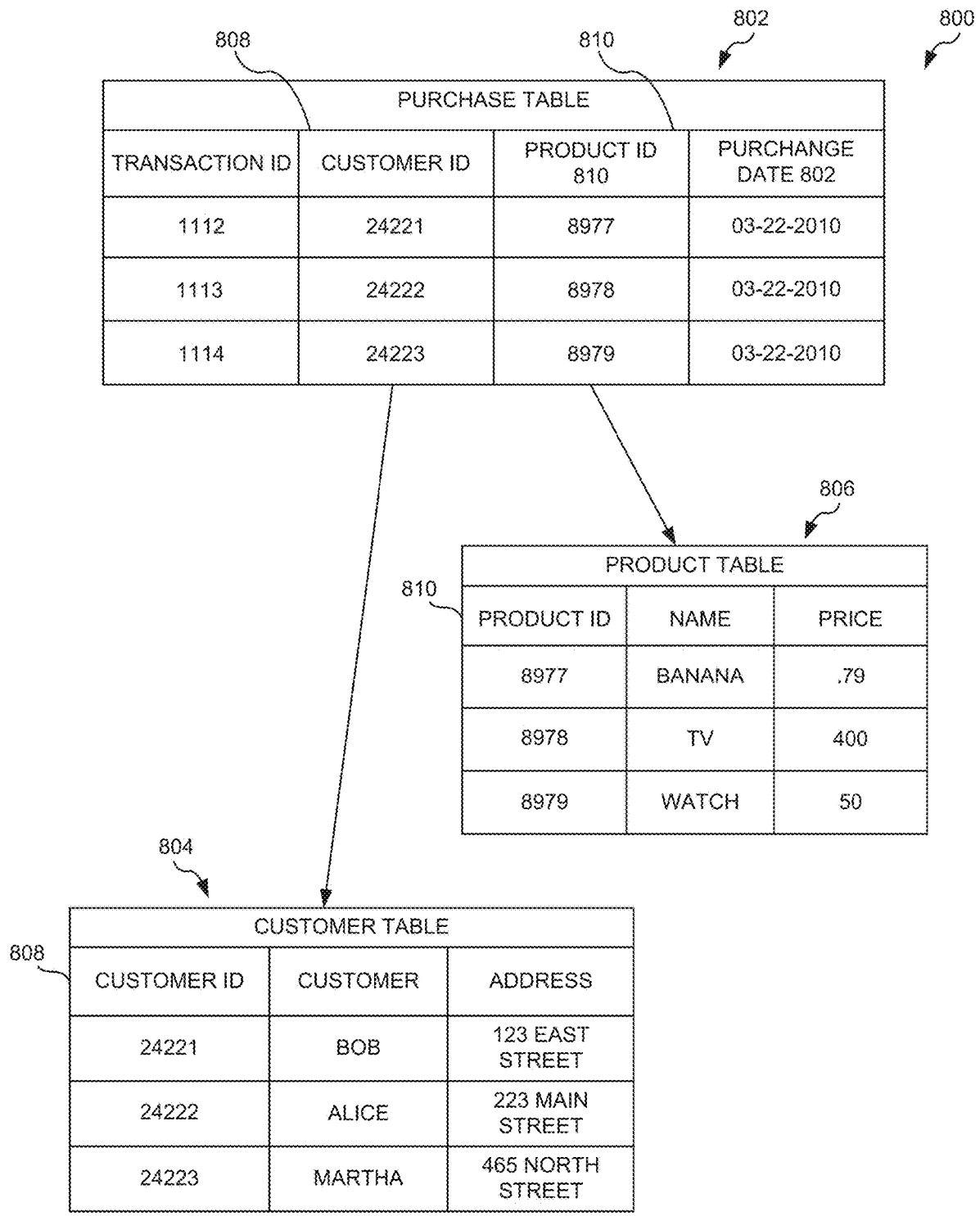
FIG. 8A is a diagram representing an example relational model having different relationships.

FIG. 8A illustrates an example of how connected information is represented and stored using a relational model 800. The relational model 800 includes a purchase table 802, a customer table 804 and a product table 806 that are connected via foreign keys 808, 810. In this example, if query is directed to which products "Alice" purchased the most, a query engine accesses the purchase table 802, the customer table 804, and the product table 806 (e.g., three different tables). Relationships between the tables 802-806 are expressed through the foreign keys 808 and 810 in the purchase table 802, the customer table 804, and the product table 806. For instance, the purchase table 802 has the foreign keys 808 and 810 (e.g., in each row) to indicate which customer (e.g., Customer ID) made a purchase. In order to determine which customer (e.g. Customer ID) purchased which product (e.g., Product ID), both the customer table 804 and the product table 806 are accessed or read, which can be an expensive and/or time consuming operation in the relational model 800.

Figure 8B:
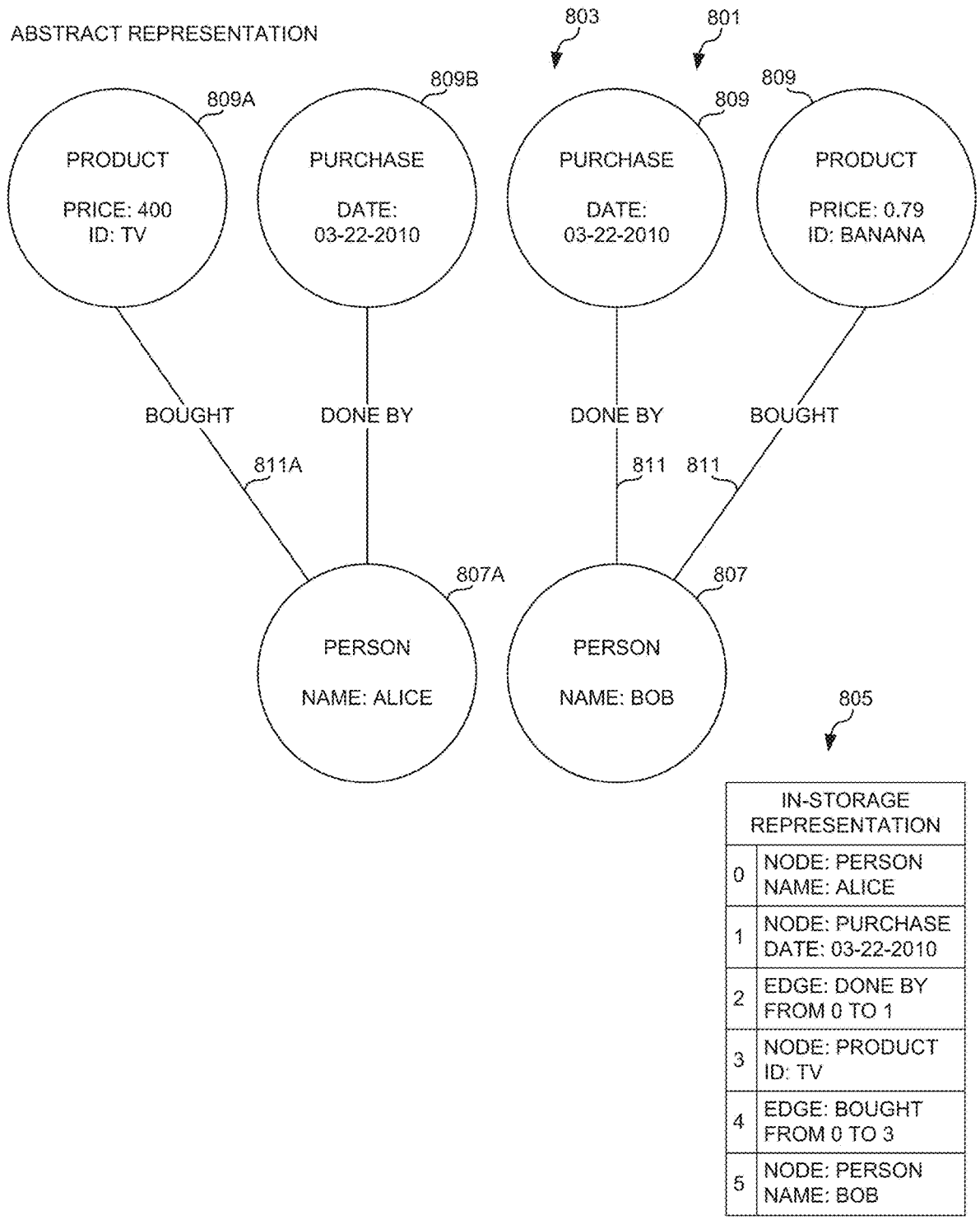
FIG. 8B is a diagram representing an example graph model.

FIG. 8B represents data in FIG. 8A in a graph model 801. Specifically, FIG. 8B includes an abstract representation of information 803 in the graph model 801 and its corresponding memory representation 805. Searching the graph model 801 involves searching a node 807 and checking neighboring nodes 809 that are linked to the node 807 via one or more links 811. For example, a query including "which products Alice bought the most" involves searching a node 807a corresponding to "Alice" and checking the neighboring nodes 809a, 809b that are linked to the Alice node 807a through a "purchase" connection or link 811a. Queries involving relationships can perform better in a graph model (e.g., the graph model 801), thereby reducing costs and/or time.

Sequential patterns, on the other hand, include access to properties of objects in the same category. This is typically a sequential access over large amounts of data. Some examples of these queries include, but are not limited to, "get the average salary of all employees in an organization," or "get the most common color of cars." These examples involve sequential access patterns. Another characteristic of these type of queries is that they usually access specific properties of all the objects of certain type (i.e., the color of all cars, or the age of every person). These queries do not use information about the relationships between objects of different types. The relational model, which uses tables to represent information, can perform best in such relationship-based queries. As the information is in the form of a table in storage, access to specified properties of the table is sequential.

Figure 9:
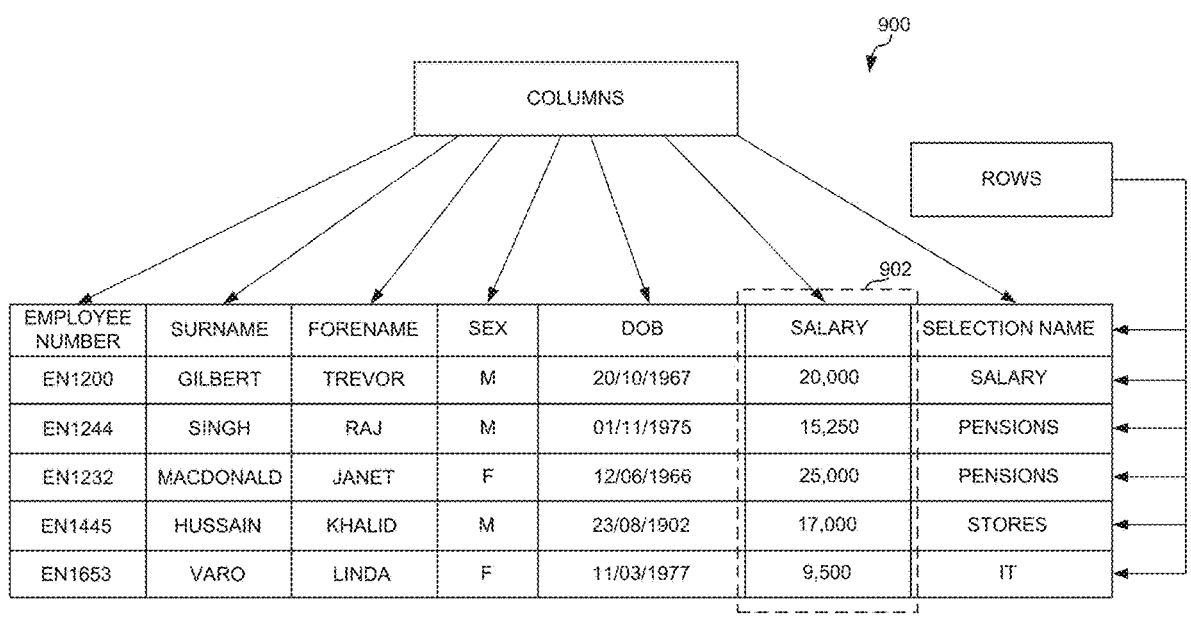
FIG. 9 is a diagram representing an example relational model.

FIG. 9 illustrates a relational model 900 (e.g., that includes sequential properties). The property "salary" of employees 902 (e.g., highlighted via text box in FIG. 9), can be stored contiguous in memory using, for example, a column store. Such organization of information facilities queries having non-relational connections (e.g., "what is the average salary") to be computed more efficiently compared to using a graph model (e.g., the graph model 801) where randomly located nodes (e.g., nodes 807) would have to be accessed. For example, if the information of FIG. 9 were stored in a graph model, every node corresponding to an employee (e.g., where each node is stored in random location in memory) would have to be accessed.

Graph databases often show improved performance compared to relational databases in queries that require exploration of connections between data, as the edges on the graph are easily traversed. However, relational databases offer the best performance for queries that iterate over properties of objects, as these properties are represented as columns in a table, easily and efficiently accessible. When a single data model (i.e., either graph or relational) is used, certain types of queries can pay a performance penalty due to the underlaying data structures (e.g., graph or relational) used to represent the information.

Query execution performance improvement could be obtained by concurrently combining the relational and graph models. In these examples, depending on the query characteristics, the most suitable model (e.g., either graph or relational) can be chosen to execute the query. However, manually maintaining both models is not a pragmatic solution. The particular data structures are typically selected by a code developer during a code development process of the application. As such, the code developer requires detailed knowledge of a relatively large number of different data structure types, a detailed knowledge of syntax implementation of the different data structure types, and a detailed knowledge of which data structure types best improve the performance metrics of interest. Additionally, in the event an application uses a particular type of data and/or different data types throughout its operation, such evolving inputs and/or evolving heterogeneous systems are too numerous for the code development personnel to consider effectively. For instance, an ordered list data type (e.g., data container) allows relatively fast retrieval of a dataset, but that same data container type exhibits a relatively slow ability for inserting new elements. In another example, a hash table data type facilitates relatively fast insertion and/or retrieval of particular dataset items, but tasks related to listing an entire dataset in a particular order (e.g., numeric order, alphabetic order, etc.) occurs relatively slowly. Still further, in the event a first data structure type is selected at a first time and is observed to exhibit relatively good performance characteristics in connection with a first type of input data, in the event the input data types and/or input data quantities change throughout the use of the coded application, performance characteristics may degrade. Because data structure selection is a laborious process requiring substantial expertise, numerous design factors, and/or possible dynamic operating conditions, applications written and/or otherwise developed by code development personnel suffer in one or more performance metrics when particular data structures are selected. In other words, relying on the discretion of the code development personnel may result in sub-standard application performance. Appropriate selection of data structures allows one or more performance metrics of an application to improve.

Some known models define a layer offering a graph query language (e.g., such as Apache Gremlin) on top of a relational database. Other solutions involve a translation of Structured Query Language (SQL) (e.g., relational) queries into a graph query language, in order to access a database that implements a graph structure. Most of the relational and graph databases implement caching mechanisms to accelerate queries by storing subsets of the data in memory. Certain databases are configured to work in-memory (MemSQL, MemGraph, etc.), issuing less frequent updates to disk. However, such known solutions focus only on one of the following aspects: ease of use through a graph interface, optimized query performance based on graph-like relationships, or optimized query performance for SQL-like queries.

Disclosed herein are example systems and methods for generating a hybrid database. Specifically, examples disclosed herein provide a data model using a graph model interface and providing a (e.g., an automatic) hybrid database using both relational and graph models. For example, methods and apparatus disclosed herein provide a hybrid database system that implements a graph interface. Internally, example methods and apparatus disclosed herein store information as a graph. Additionally, example methods and apparatus disclosed herein (e.g., automatically) generate relational databases (e.g., tables) based on the graph databases to increase performance for certain types of queries (e.g., that may be better suited for relational queries). For example, tables are created following a relational model only for relevant data (i.e., data that can be used to respond to queries faster) associated with the graph databases. As a result, example systems disclosed herein employ a hybrid database system that is more performant than either a graph or a relational database system, alone.

Additionally, disclosed herein are example systems and methods for employing artificial intelligence and/or machine learning to predict an execution performance of a query (e.g., a fastest query execution performance) using the hybrid database system (e.g., the graph model or the relational model).

Artificial intelligence (AI), including machine learning (ML), deep learning (DL), and/or other artificial machine-driven logic, enables machines (e.g., computers, logic circuits, etc.) to use a model (e.g., a model classifier, a LSTM model) to process input data (e.g., a query, contextual information, etc.) to generate or predict an output (e.g., a binary output) based on patterns and/or associations previously learned by the model via a training process. For instance, the model may be trained with data (e.g., past queries, context information, etc.) to recognize patterns and/or associations and follow such patterns and/or associations when processing input data such that other input(s) result in output(s) consistent with the recognized patterns and/or associations.

Many different types of machine learning models and/or machine learning architectures exist. In general, machine learning models/architectures that are suitable to use in the example approaches disclosed herein can be any type of machine learning model/architecture, any type of artificial intelligence, and/or any type of neural networks (e.g., variational encoders, convolution neural networks, deep neural network, replacement neural network, etc.)

In general, implementing a ML/AI system involves two phases, a learning/training phase and an inference phase. In the learning/training phase, a training algorithm or procedure is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Self-supervised training employs supervised training characteristics, but self-initiates training without user involvement. Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Also, in some examples, the output data may undergo post-processing after it is generated by the AI model to transform the output into a useful result (e.g., a display of data, an instruction to be executed by a machine, etc.).

In some examples disclosed herein, a Long-Short Term Memory model is used. Using a Long-Short Term Memory model enables the model to predict an optimal query engine for a received query based on current conditions of a query selection system. Some examples disclosed herein employ a recurrent neural network (RNN) that uses self-supervised learning during a training phase to teach or train the query classifier model to predict which search engine (e.g., graph or relational) is optimal for execution of a received query when operating in an inference phase. However, other types of machine learning models could additionally or alternatively be used.

Thus, example query selection systems disclosed herein can be formed by: a) automatically generating code for generating a hybrid database (e.g., relational tables creation, accelerating the response of certain types of queries); and b) automatically translating/routing queries to the optimal (e.g., fastest) query engine (relational or graph) based on a classification system using machine learning techniques (e.g., a context-based neural net classification using Long Short-Term Memory (LSTM) model).

FIG. 1 is a schematic illustration of an example query selection system 100 in accordance with teachings of this disclosure for improving query execution performance. In some examples, a machine-learning based query selection system is used to predict optimal query execution performance. The example query selection system 100 can be implemented using, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device, and/or any combination thereof. In some examples, one or more components of the query selection system 100 of FIG. 1 can be located remotely from and communicatively coupled (e.g., via a local area network (LAN) connection, a cellular connection, a network, a network, etc.) to one or more other components of the example query selection system 100. In some examples the query selection system 100 can be located within a computing device (e.g., a server, etc.) in a self-contained manner. In some examples, the query selection system 100 can be a separate entity that resides on a first computing device (e.g., a mobile device, a workstation, etc.) and is communicatively connected (e.g., via a network) to a second computing device (e.g., a server) that includes a hybrid database 102.

To improve query execution performance, the query selection system 100 of the illustrated example includes the hybrid database 102. Specifically, the hybrid database 102 of the illustrated example includes a graph database 104 and a relational database 106. For example, to improve query performance for certain types of queries that can perform more efficiently using relational models (e.g., queries that include relationships), the hybrid database 102 of the illustrated example implements a graph interface that stores (e.g., internally) information based on a graph model (e.g., via the graph database 104) and generates or converts (e.g., automatically) the information from the graph model to a relational model (e.g., via the relational database 106).

The graph database 104 of the illustrated example can include data received via a user input (e.g., a file generated by a user), extracted from an image or video, extracted from one or more files, and/or obtained via any other input(s). In some examples, the query selection system 100 can employ a user interface to enable input of data or information to the graph database 104. In some examples, the query selection system 100 receives, accesses, retrieves, and/or otherwise obtains information associated with the graph database 104. In some examples, the query selection system 100 provides the graph database 104 via inputs received from a user, a machine, a file, a video file, etc., and (e.g., automatically) generates the relational database 106 based on the received inputs.

To generate the relational database 106, the example query selection system 100 of the illustrated example employs a hybrid database generator 108. Specifically, the hybrid database generator 108 of the illustrated example generates (e.g., constructs or populates) the relational database 106 based on information and/or data from (e.g., stored in) the graph database 104. Specifically, the hybrid database generator 108 generates tables following a relational model only for relevant data provided in the graph database 104. For example, relevant data can include information that can be used to improve (e.g., increase) query response times. In other words, specific information from the graph database 104 is used to generate the relational database 106. Thus, in some instances, the relational database 106 includes partial data from the graph database 104. To detect information (e.g., new data) in the graph database 104, the hybrid database generator 108 performs periodic analysis of the graph database 104. The frequency of the periodic analysis can depend on workloads of the query selection system 100 (e.g., read-only vs. read-write, etc.). In some examples, the hybrid database generator 108 provides means for generating the hybrid database 102 and/or the relational database 106. The hybrid database generator 108 is described in greater detail in connection with FIGS. 3 and 6.

To parse a query 115 from a user 111 as a graph syntax, the query selection system 100 of the illustrated example includes a graph language query 110. In some examples, the graph language query 110 receives the query 115 (or a plurality of queries) from the user 111 and/or a plurality of queries simultaneously from multiple users. The graph language query 110 of the illustrated example employs a graph query language syntax to convert input of the query 115 to machine readable format readable by the query selection system 100. For example, the graph language query 110 converts the query 115 to a query interface function. Specifically, the graph language query 110 identifies a function of the query 115 and the input arguments of the identified function. For example, the following query "whose name is Hercules" may be expressed or identified by the graph language query 110 as:

$$q = g \cdot V(\ ).\text{has}(\text{'name'}, \text{'Hercules'}) \qquad \text{Eq. 1:}$$

The function is identified as "V( )" and the input arguments of the function are identified as "name" and "Hercules". The graph language query 110 communicates the query (q) to a contextual query classifier 112 for further processing as described in FIG. 2A. In some examples, the graph language query 102 provides means for receiving a query (e.g., the query 115 from the user 111). In some examples, the graph language query 110 provides means for converting a text query to a query interface function.

In some examples, however, the graph language query 110 can include other language-type query interfaces such as Structured Query Language Syntax and/or other non-graph based query language. In some such cases, the query 115 can be in other formats such as, for example, Structured Query Language syntax and/or another non-graph query language syntax. In some examples, to enable entry of the query 115, the query selection system 100 can include a user interface in which the example query selection system 100 renders a graphical user interface (GUI) and/or terminal screen for data input/output by the user 111. In some examples, a computing device employed by the user 111 communicatively connects (e.g., remotely) to the query selection system 100 via a user interface, in which the example query selection system 100 renders a graphical user interface (GUI) and/or terminal screen for data input/output that can be communicatively coupled to the computing device via a network. In some examples, the graph language query 110 receives a query from another computing device (e.g., another server, workstation, etc.).

To predict optimal query performance or execution of the query 115, the query selection system 100 of the illustrated example includes a contextual query classifier 112. The graph language query 110 of the illustrated example communicates the query 115 to the contextual query classifier 112. The contextual query classifier 112 evaluates and/or predicts which database (e.g., the graph database 104 or the relational database 106) is optimal for executing the query 115. As described in greater detail in connection with FIGS. 2A and 4-6, the contextual query classifier 112 employs artificial intelligence and/or machine learning to predict the optimal search engine for each query (e.g., the query 115) received by the query selection system 100.

Upon predicting which database is optimal for a given query, the contextual query classifier 112 of the illustrated example routes the query 115 to the appropriate one of a graph query engine 114 to perform execution of the query 115 using the graph database 104 or a relational query engine 116 to execute the query 115 using the relational database 106. In some examples, the contextual query classifier 112 provides means for predicting an optimal (e.g., fastest) query engine. In some examples, the contextual query classifier 112 provides means for training a model classifier for predicting an optimal (e.g., fastest) query engine.

The graph query engine 114 of the illustrated example does not need to translate the query 115 to a graph language syntax prior to searching the graph database 104 because the graph language query 110 configures the query 115 according to graph query language syntax. In some such examples, the graph query engine 114 can employ a translator to translate the query 115 to a graph query language syntax prior to executing the query 115 via the graph database 104. In some examples, the graph query engine 114 provides means for searching the graph database 104.

Prior to executing the query 115, the translator 117 translates the query 115 to an appropriate query language supported by the relational model (e.g., the relational query engine 116). For example, the translator 117 translates expressed in a graph query language syntax to a relational query language syntax (e.g., a SQL syntax). For example, the translator 117 of the illustrated example is a Structured Query Language (SQL) translator configured to translate the query 115 (e.g., or a graph-language query) to a searchable query for use by the relational query engine 116 (e.g., a relational-language query). In some examples, the translator 117 provides means for converting a query from a first syntax (e.g., a graph-language query syntax) to a second syntax (e.g., a relational-language query syntax) for searching on the relational database 106.

The relational query engine 116 parses the relational-language query (e.g., the query translated by the translator 117) and executes the query using the relational database 106. In some examples, the relational query engine 116 provides means for searching the relational database 106.

Storage 118 implements the contextual query classifier 112 and/or stores the graph database 104 and the relational database 106. The storage 118 of the illustrated example of FIG. 1 is implemented by any memory, storage device and/or storage disc for storing data such as, for example, flash memory, magnetic media, optical media, solid state memory, a solid state drive (SSD), hard drive(s) (HDD), thumb drive(s) and/or any other suitable drive(s) or storage to store and retrieve digital information or data. In some examples, the storage 118 provides means for storing the graph database 104 and/or the relational database 106.

In operation, the query selection system 100 of FIG. 1 accelerates query computations by using the most suitable data representation for each query (e.g., the query 115) received via the graph language query 110. Specifically, the example query selection system 100 of FIG. 1 provides a unified database performance improvement, where the graph database 104 or the relational database 106 are each more performant than the other based on the executed query 115. The example query selection system 100 of FIG. 1 generates the graph database 104 based on information provided to the query selection system 100 (e.g., by a user, via a video, etc.) and (e.g., automatically) creates the relational database 106 based on the graph database 104 to route queries to the relational database 106 as needed to improve query execution performance. As described in greater detail below, the example query selection system 100 of FIG. 1 includes: automatic code generation; and query classification, thereby allowing users to maintain a useful or powerful graph abstraction and providing optimized data access independently from the underlying hardware and low-level data structures used to store the query selection system 100.

Figure 2A:
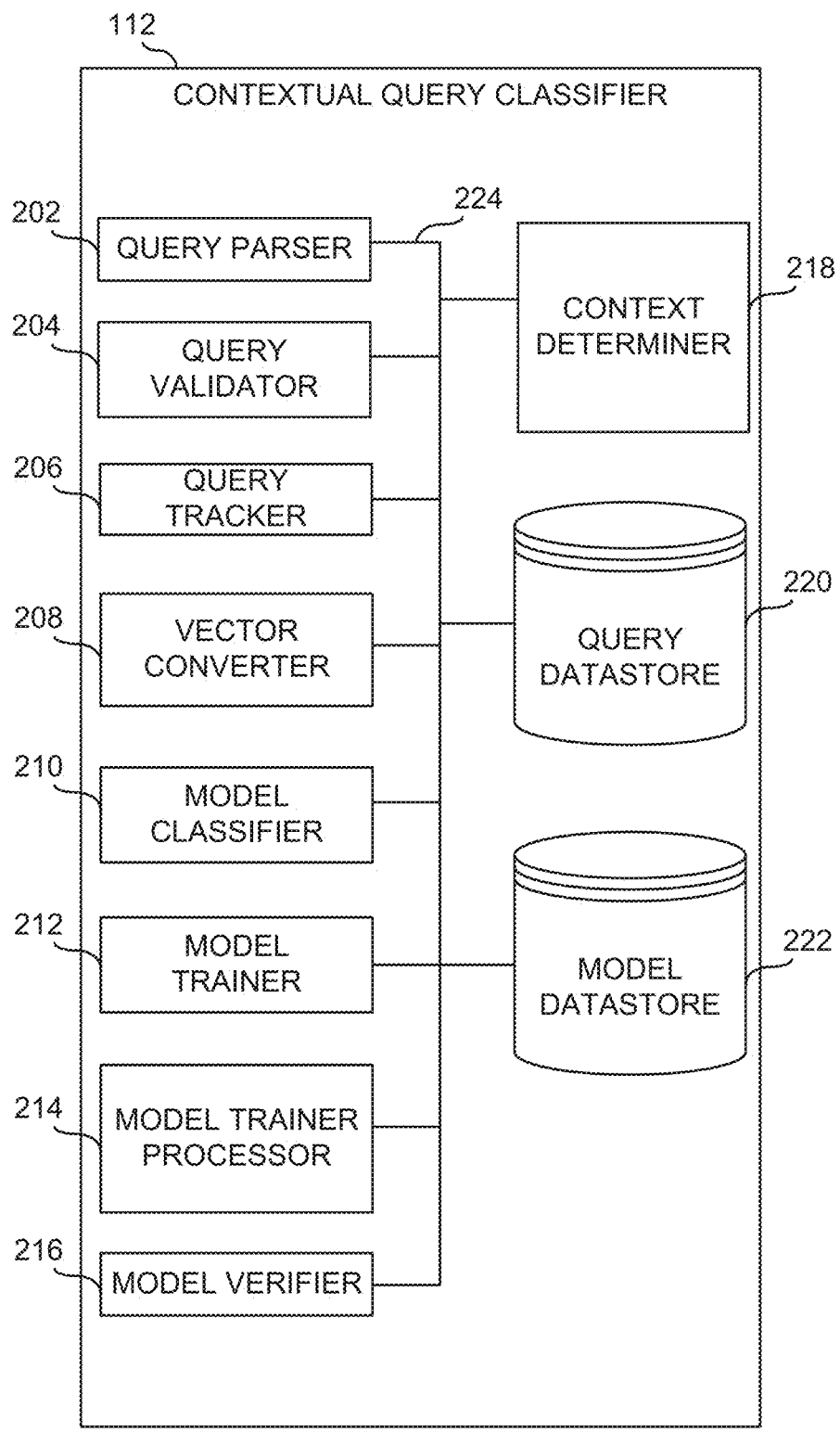
FIG. 2A is a block diagram of an example query classifier of the example query selection system of FIG. 1 for selecting between multiple query engines.

FIG. 2A is a schematic illustration of the example contextual query classifier 112 of FIG. 1. The example contextual query classifier 112 of FIG. 2A includes an example query parser 202, an example query validator 204, an example query tracker 206, an example vector converter 208, an example model classifier 210, an example model trainer 212, an example machine learning model trainer processor 214, an example model verifier 216, an example context determiner 218, an example query datastore 220, an example model datastore 222, and the aforementioned structure may be communicatively connected therebetween via an example bus 224.

The query parser 202 parses the query (q) from the graph language query 110 to decompose the query (q) into discrete, semantic elements (e.g., an array of discrete semantic elements). For example, the query parser 202 parses a query (e.g., expressed using the Gremlin query language: get the nodes where the property "name" is "Hercules") into sematic elements following the query language syntax. In some examples, the query parser 202 parses each query (e.g., query q) received by the graph language query 110. For example, the query parser 202 parses the elements of the query (q) of Eq. 1 noted above (e.g., q=g·V( ). Has ('name', 'Hercules')) into an array of object(s) and/or attribute(s) for further processing. An example parsed query (q') includes:

$$q' = \{V(\ ), \text{has}, \text{name}, \text{Hercules}\} \quad \text{Eq. 2}$$

The query parser 202 communicates the parsed query (q') to the query validator 204, the query tracker 206 and the vector converter 208. In some examples, the query parser 202 provides means for parsing a query between a first format (e.g., query function interface) and a second format (e.g., graph language syntax).

To determine if the relational database 106 is an option to perform the query (e.g., the query 115, the parsed query q'), the query validator 204 validates or determines if the hybrid database 102 or the hybrid database generator 108 includes the object(s) and/or the attribute(s) of the parsed query (q'). For example, the query validator 204 is configured to search a list of object(s) and/or attribute(s) that are included in the relational database 106 and can compare the object(s) and/or attribute(s) of the parsed query (q') with the list of object(s) and/or attribute(s) of the hybrid database 102 and/or the hybrid database generator 108. Thus, the query validator 204 determines whether the object(s) and/or attribute(s) of the parsed query (q') correspond to (e.g., match) the list of object(s) and/or attribute(s) of the hybrid database 102 and/or the hybrid database generator 108. In response to determining that that the object(s) and/or attribute(s) of the parsed query (q') correspond to (e.g., match) the list of object(s) and/or attribute(s) of the hybrid database 102 and/or the hybrid database generator 108, the query validator 204 determines that the relational database 106 is available for executing the parsed query (q'). In response to determining that that the object(s) and/or attribute(s) of the parsed query (q') do not correspond to (e.g., do not match) the list of the list of object(s) and/or attribute(s) of the hybrid database 102 and/or the hybrid database generator 108, the query validator 204 determines that the relational database 106 is not available for executing the parsed query (q'). In some examples, the query validator 204 provides means for confirming presence of information (e.g., objects and/or properties) in the relational database 106.

The query tracker 206 stores parsed queries (e.g., the parsed query q') that have been received by the query selection system 100 (e.g., the graph language query 110). For example, the query tracker 206 stores the parsed queries in the query datastore 220. The stored queries (e.g., the parsed query (q')) can be used by the model trainer 212 to train the classifier model 210 as described in greater detail below. The query tracker 206 can store the queries (e.g., prior received queries) in the query datastore 220 in any format including, but not limited to, the original query format (e.g., the query 115 string provided by the user 111), a query function interface (q) (e.g., provided by the graph language query 110), and a parsed query (q') format. In some examples, the query tracker provides means for storing and/or tracking the past queries received by the query selection system 100.

The vector converter 208 translates the parsed query (q') into a feature vector for processing by the model classifier 210. In the illustrated example, the vector converter 208 converts the parsed query (q') to an embedded query (q*). The embedded query (q*) can include machine readable values (e.g., numbers, characters, binary values, etc.) that can be read as inputs by the model classifier 210. For example, the vector converter 208 employs Word2Vec to convert the parsed query (q') to a feature vector (e.g., the embedded query (q*)). For example, Word2vec is a two-layer neural net that processes a word-based input or text corpus (e.g., the parsed query (q')) and outputs a set of vectors (e.g., feature vectors) representative of the words of the text corpus. In other words, the vector converter 208 (e.g., Word2Vec) converts text into a numerical form representative of the converted text that can be processed by a neural network or machine learning model. In some examples, the vector converter 208 can be any other type of translator or converter that converts a query (e.g., the query q) and/or a parsed query (q') to an input for use by a machine learning model (e.g., an algorithm, a neural network, etc.). The vector converter 208 communicates the embedded query (q*) to the model classifier 210 and the model classifier 210 receives the embedded query (q*) as an input. In some examples, the vector converter 208 stores the embedded query (q*) in the query datastore 220 for use by the model trainer 212. In some examples, the vector converter 208 provides means for converting a query from a first format (e.g., graph language syntax, text format, etc.) to a second format (e.g., vector format, numerical format, binary format, machine readable format, etc.).

The context determiner 218 retrieves, receives, obtains, determines and/or otherwise contains context information (C r) (e.g. parameters) associated with a current state of the query selection system 100 and/or the hybrid database 102. In turn, the context determiner 218 communicates the context information to the model classifier 210 and the model classifier 210 receives the context information (CO as an input value. Some examples of the context information (CO include, but are not limited to, engine load, graph analytics, system load, cache, and/or any other parameter(s) that can impact performance of a query. For example, engine load includes information about a number of queries simultaneously executed in each engine at any point in time. This information can be important because even if, for example, the relational query engine 116 can execute a new query much faster in normal conditions, under heavy engine load of the relational query engine 116, the query may execute faster in the graph query engine 114. In some examples, the query selection system 100 maintains this information in the storage 118, the query datastore 220 and/or the model datastore 222. Graphic analytics can include, for example, metrics on a graph that provide information on data distribution and depthless of data relationships. These metrics include, for example, but are not limited to, a number of nodes and edges, a centrality of main nodes, maximum, minimum and average degree of nodes, nodes-to-edge ratio, a graph radius, girth, etc. System load includes information or characteristics of a central processing unit (CPU) (e.g., including processing capacity, processing power, etc.), accelerators, CPU memory, network bandwidth utilization, and/or other parameter(s) or characteristic(s) of the query selection system 100 that can impact query performance of the graph query engine 114 and/or the relational query engine 116. For instance, high memory utilization or the use of certain accelerators can heavily affect the performance of the relational query engine 116. The context $C_t$ can include information that is learned by the model classifier 210 during a training phase provided by the model trainer 212 as described in greater detail below. The context determiner 218 provides the context information to the model classifier 210 and the model classifier 210 receives the context $C_t$ information as an input. In some examples, the context determiner 218 provides means for obtaining, determining or otherwise retrieving context information ($C_t$) (e.g. parameters) associated with a current state of the query selection system 100 and/or the hybrid database 102.

The model classifier 210 predicts which one of the graph query engine 114 or the relational query engine 116 is optimal for executing the parsed query (q') based on the embedded query (q*) and the context (CO. For example, the classifier model 210 predicts which one of the graph query engine 114 or the relational query engine 116 can process the query 115 (e.g., the parsed query q') in the shortest amount of time. In turn, after predicting an optimal engine, the model classifier 210 routes the query (e.g., the query function interface q, the query 115, the parsed query q') to either the graph query engine 114 to execute the query using the graph database 104 or to the relational query engine 116 to execute the query using the relational database 106. In some examples, the model classifier 210 provides means for predicting an optimal query engine for executing a received query.

To predict which one of the graph query engine 114 or the relational query engine 116 is optimal for executing the query 115, the model classifier 210 employs a Long-Short Term Memory (LSTM) model (e.g., a classifier). The LS™ model of the illustrated example is a sequence aware model that predicts the optimal (e.g., fastest) query engine for a received query (e.g., the query 115, the query interface function q) and routes the received query (e.g., the query 115, the query interface function q) to the predicted optimal query engine (e.g., the graph query engine 114 of the relational query engine 116). The decision or prediction provided by the model of the illustrated example is a sequence and context aware binary classification model based on the Long-Short Term Model.

The following is schematic diagram of the model classifier 210:

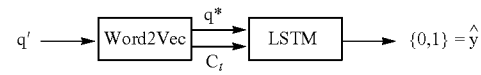

The model classifier 210 provides a predicted output ($\hat{y}$) (e.g., a binary output) representative of an optimal query engine selection. For example, a first value of a first binary output represents the graph query engine 114 and a second value of a second binary output represents the relational query engine 116. For example, a binary value "0" represents a "not selected" query engine and a binary value of "1" represents a "selected" query engine. In the above-noted example, the binary output {0, 1} is presentative of employing the relational query engine.

The example model trainer 212, in connection with the example model trainer processor 214, trains the model classifier 210 to predict optimal search engines based on past queries and content provided by the context determiner 218. To train the model, the model trainer 212 of the illustrated example employs a self-supervised training and conducts the training when the query selection system 100 is off-line. For example, the query selection system 100 can be off-line when the query selection system 100 is not conducting a search. In some examples, the model trainer 212 provides means for training a model to predict an optimal query engine for a received query.

Figure 2B:
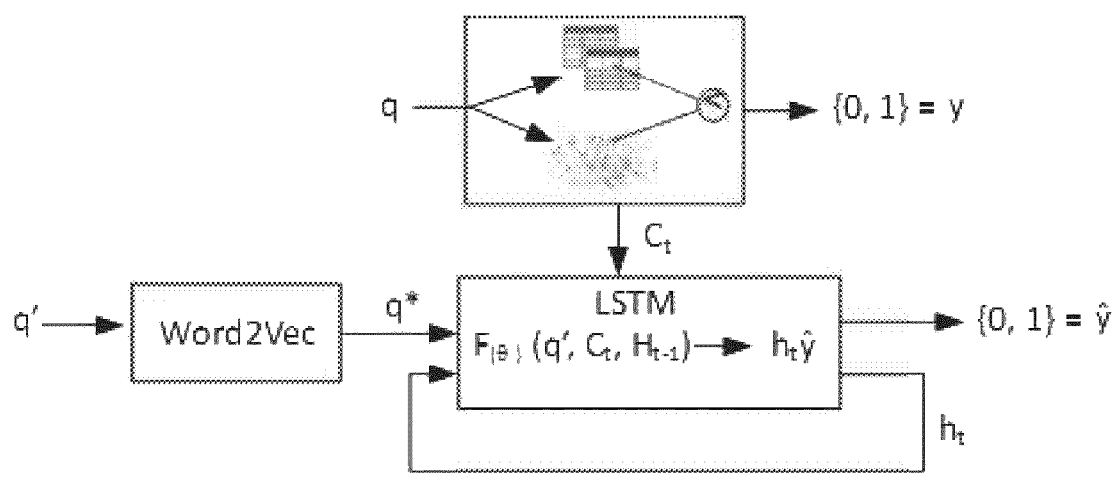
FIG. 2B illustrates an example training procedure employed by an example model trainer of the example query classifier of FIG. 2A.

FIG. 2B illustrates an example training procedure employed by the model trainer 212 of FIG. 2A. Referring to the training procedure of FIG. 2B, training is performed using training data. For example, the model trainer 212 trains the model classifier 210 of FIG. 2A by executing a dataset of ordered batches of past queries (q) on both the graph database 104 and the relational database 106 to obtain a ground truth or actual result (y) indicative of which query engine provides the fastest query. For example, each training query (q, q') is run in both query engines (e.g., graph query engine 114 and the relational query engine 116), and the execution time is compared to obtain ground truth. The context $C_t$ information at the time of the execution is saved by the context determiner 218 and provided to the model trainer 212 as training data for the LSTM model. Additionally, the model trainer 212 annotates each sample query with the fastest query.

In examples disclosed herein, the training data originates from the query datastore 220 of FIG. 2A. The query datastore 220 includes past queries (q) and the parsed queries (q') that have been stored in the query datastore 220 by the query tracker 206 of FIG. 2A. In other words, the query datastore 220 includes past queries that have been received by the query selection system 100 that are employed during training of the model classifier 210. Because self-supervised training is used, the training data is labeled. Labeling is applied to the training data by query tracker 206 and/or the model trainer 212. For example, the query tracker 206 labels past queries as a batch of sample queries to be employed by the model trainer 212. In some examples, the query datastore 220 provides means for storing past query requests received by the query selection system 100.

After the queries (q) are performed on both databases and each sample has been annotated with the fastest query, the model trainer 212 employs the past queries (q, q') from the query datastore 220 and the current context $C_t$ to train the LSTM model (e.g., the model classifier 210). For example, the training procedure trains the LSTM model to predict which query engine provides an optimal (e.g., fastest) performance (e.g., the predictive result (ST)). The training queries obtained from the query datastore 220 can be in query function interface (q) format and/or can be in parsed query (q') format. If necessary, the input query to the training model can be first parsed, deconstructed and converted into a feature vector (q*) (e.g., using word2Vec) as described above.

The context (C t) plays an important role in query engine performance, as it sets conditions under which a query is executed. Considering context (CO as an input, the LSTM model (e.g., the model classifier 210) can learn (e.g., via the model trainer 212) different conditions that can lead to performance changes and predicts their evolution over time. Moreover, usage of ordered sets of past queries (q, q') allows the LSTM model to learn the effects of caching mechanisms. For example, the model can infer that if a query brings certain data into memory for one of the engines, a new incoming query can benefit from this caching effect. Therefore, the model classifier 210 considers performance impact that query history has on current queries.

The LSTM model is formalized as a function $f_\theta$ parameterized by the weights $\theta$. For example, the LSTM receives as input the embedded query q*, the context C and the previous hidden state $h_{t-1}$ and provides the predicted database engine (ŷ) to be used for processing a query (q, q'). Eq. 3 is an example algorithm that can be employed by the LSTM model to predict an optimal query engine. After each evaluation, the LSTM model also updates its hidden state h.

$$\hat{y} = f_\theta(q^*, C, h) \qquad \text{Eq:3}$$

During training, the model verifier 216 of FIG. 2A compares the query results of the databases (y) (i.e., actual outputs (e.g., the binary output y)) and the predicted outputs (ŷ) (e.g., the predicted binary output ŷ) provided by the LSTM model to determine accuracy of the LSTM model. The results of the queries that are run or executed in the graph database 104 and the relational database 106 (e.g., the binary output (y)) are compared to the predicted results (ŷ) provided by the LSTM model (e.g., the predicted binary output (ŷ)). The actual results (y) are compared to the predicted results (ŷ) to determine the differences therebetween. These differences are used to back propagate and adjust one or more weights in the LSTM model. In some examples, the model verifier 216 provides means for verifying the results of the model classifier.

For example, as set forth in equation 4 below, the optimization objective to train the LSTM-based binary classifier weights $\theta$ is based on the cross-entropy loss with regularization:

$$L(\theta) = \underbrace{y\log(\hat{y}) + (1-y)\log(1-\hat{y})}_{\text{Cross-entropy}} + \underbrace{\lambda \sum_{i=0}^{N} \theta_i^2}_{\text{Regularization}} \qquad \text{Eq. 4}$$

The cross-entropy term penalizes wrong predictions, providing the main training signal. The regularization term penalizes big parameter values preventing overfitting and improving generalization. The amount of regularization can be tuned by $\lambda$ and is application dependent. The optimization uses back-propagation through time with a time window T. The time window determines the number of previous queries that have influence on the predicted query performance, and $\lambda$ can be empirically tuned for each specific application. This optimization procedure is based on gradients (obtained from the cost function evaluation) and the learning rate a.

$$\theta' = \theta_i + \alpha \nabla_\theta L(\theta) \qquad \text{Eq. 5}$$

In some examples, training is performed until a batch of sample queries is exhausted. In some instances, training is performed using hyperparameters that control how the learning is performed (e.g., a learning rate, a number of layers to be used in the machine learning model, etc.). Training can be implemented as scheduled learning windows where several query batches are executed. In this example, the learning rate a plays an important role in adapting the query selection system 100 to temporal windows of time that have influence on performance. If the learning rate is high, the model classifier 210 can adapt faster to changes in the dynamics of query performance (e.g., peak-hour conditions where multiple users concurrently issue queries).

Once training is complete, the model (e.g., LSTM model) is deployed for use as an executable construct that processes an input (e.g., a query q' and Context $C_t$) and provides an output (e.g., a predicted binary output ŷ) based on the network of nodes and connections defined in the model. The model is stored at the model datastore 222. The model (e.g., the LSTM model) may then be executed by the model classifier 210.

Figure 3:
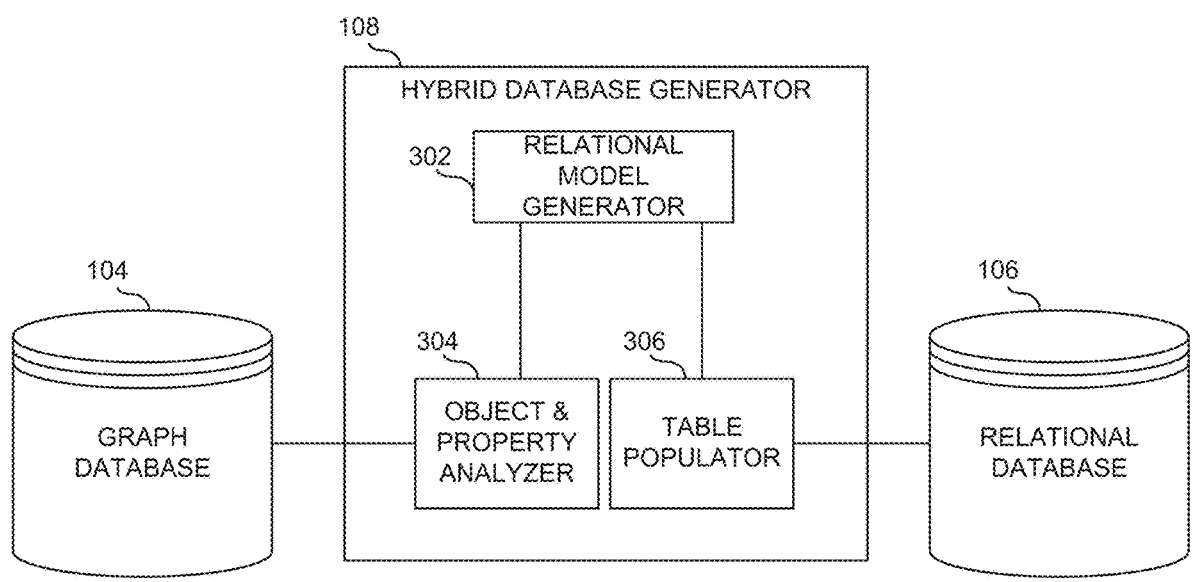
FIG. 3 is a block diagram of an example hybrid database generator of the example query selection system of FIG. 1 for generating a relational database from information obtained from a graph database.

FIG. 3 is a block diagram of the example hybrid database generator 108 of the example query selection system 100 of FIG. 1 for generating the relational database 106 from information obtained from a graph database 104. The example hybrid database generator 108 of the illustrated example includes an example relational model generator 302, an example object and property analyzer 304, and an example table populator 306.

The object and property analyzer 304 of the illustrated example extracts information from the graph database 104 for generating the relational database 106. Specifically, the object and property analyzer 304 examines data stored in the graph database 104 and identifies one or more objects stored in the graph database 104. For example, an output of the object and property analyzer 304 is a list of objects and properties that have a significant representation. In some examples, the object and property analyzer 304 provides means for identifying and/or extracting information in the graph database 104.

To determine if an object and the associated properties of the object have a significant representation, the object and property analyzer 304 of the illustrated example determines if a number of instances of the objects in the graph database 104 exceeds a threshold. For example, the threshold can be a number that is greater than, for example, 5, 10, 15, 100, and/or any other value. The number of instances used as a threshold can be determined empirically and/or can depend on computing capabilities of the query selection system 100 and an amount of memory available in the query selection system 100. In some examples, the object and property analyzer 304 provides means for determining a number of instances of an object in the graph database 104. In some examples, the object and property analyzer 304 provides means for comparing a number of instances of an object in the graph database 104 to a threshold.

When an identified object exceeds the threshold, the object and property analyzer 304 of the illustrated example extracts one or more common properties of the different objects identified by the object and property analyzer 304. Specifically, the extracted properties are associated with the identified objects and are common and present in across all of the identified objects. Properties that are present in only one instance of the identified objects are discarded (e.g., not used) for the relational database generation. The object and property analyzer 304 of the illustrated example can employ depth-first search (DFS) and/or breadth-first search (BFS), which are tools or common algorithms for graph traversal, to analyze and extract the principal elements in the graph. For example, a surveillance application can populate a graph with many objects of a type "Person" or "Car" as nodes in the graph. Given the frequency of these objects (e.g., exceeding a threshold), the object and property analyzer 304 concludes that an application is mostly interested in those objects. Once a graph has a significant number of elements of an object or class ("person", "car", etc.), as compared to elements of other less important objects or classes, the properties of those objects are used to create tables, following a relational model. In some examples, the object and property analyzer 304 provides means for extracting one or more properties associated with an object stored in a graph database 104.

Given that applications continuously push/update new information to the graph database 104, the object and property analyzer 304 performs periodic analysis of data in the graph database 104. The frequency of the analysis can depend on workloads (e.g., read-only vs read-write) of the query selection system 100.

The relational model generator 302 (e.g., automatically) generates code (e.g., an SQL code) to build a relational model (i.e., tables and primary keys). Each object extracted by the object and property analyzer 304 is represented or formatted as a row in an object table, and each property of these objects is represented or formatted in a column in the object table. The relational model generator 302 generates as many object tables as different objects are represented in the data. The code generation generated by the relational model generator 302 is performed by concatenating strings that result from the list of objects and properties provided or extracted by the object and property analyzer 304 (e.g., following SQL syntax). The generated code is executed, and the relevant object tables created. The relational model generator 302 also maintains (e.g., keeps track) or stores in memory the object tables created and provides this information as input to the contextual query classifier 112 and/or the query validator 204. For example, the contextual query classifier 112 determines an availability of the relational query engine 116 based on the object table information provided by the relational model generator 302. In some examples, the contextual query classifier 112 determines an availability of the relational query engine 116 based on the output of the list of objects and properties provided by the object and property analyzer 304. In some examples, the relational model generator provides means for generating code for establishing one or more tables in the relational database 106. In some examples, the object and property analyzer 304 provides means for executing code or generating tables (e.g., object tables) for the relational database 106.

The table populator 306 of the illustrated example moves the data (e.g., the objects and its properties) from the graph database 104 to the respective ones of the generated relational object tables generated by the relational model generator 302. Thus, the table populator 306 populates the object tables created by the relational model generator 302 with objects and properties identified by the object and property analyzer 304 to generate the relational database 106. The table populator 306 also maintains relational database consistency by confirming that write operations on the graph database 104 are properly reflected into the respective object tables of the relational database 106. In some examples, the table populator 306 maintains a list of objects and properties in each object table. Upon each new write query, the query is checked for changes in properties or objects that have representation in the object tables, and the table populator 306 propagates those changes, if necessary. In some examples, the table populator 306 provides means for populating data (e.g., objects and properties) in one or more tables of the relational database 106.

While an example manner of implementing the query selection system 100 is illustrated in of FIGS. 1-3, one or more of the elements, processes and/or devices illustrated in FIGS. 1-3 may be combined, divided, re-arranged, omitted, eliminated and/or implemented in any other way. Further, the example hybrid database 102, the graph database 104, the example relational database 106, the example hybrid database generator 108, the example graph language query 110, the example contextual query classifier 112, the example graph query engine 114, the example relational query engine 116, the translator 117, the example storage 118, the example query parser 202, the example query validator 204, the example query tracker 206, the example vector converter 208, the example classifier model 210, the example classifier model trainer 212, the example machine learning model trainer processor 214, the example model verifier 216, the example context determiner 218, the example query datastore 220, the example model datastore 222, the example relational model generator 302, the example object and property analyzer 304, the example table populator 306 and/or, more generally, the example query selection system 100 of FIGS. 1-3 may be implemented by hardware, software, firmware and/or any combination of hardware, software and/or firmware. Thus, for example, any of the example hybrid database 102, the graph database 104, the example relational database 106, the example hybrid database generator 108, the example graph language query 110, the example contextual query classifier 112, the example graph query engine 114, the example relational query engine 116, the translator 117, the example storage 118, the example query parser 202, the example query validator 204, the example query tracker 206, the example vector converter 208, the example classifier model 210, the example classifier model trainer 212, the example machine learning model trainer processor 214, the example model verifier 216, the example context determiner 218, the example query datastore 220, the example model datastore 222, the example relational model generator 302, the example object and property analyzer 304, the example table populator 306 and/or, more generally, the example query selection system 100 of FIGS. 1-3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hybrid database 102, the graph database 104, the example relational database 106, the example hybrid database generator 108, the example graph language query 110, the example contextual query classifier 112, the example graph query engine 114, the example relational query engine 116, the translator 117, the example storage 118, the example query parser 202, the example query validator 204, the example query tracker 206, the example vector converter 208, the example classifier model 210, the example classifier model trainer 212, the example machine learning model trainer processor 214, the example model verifier 216, the example context determiner 218, the example query datastore 220, the example model datastore 222, the example relational model generator 302, the example object and property analyzer 304, the example table populator 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the query selection system 100 of FIGS. 1-3 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
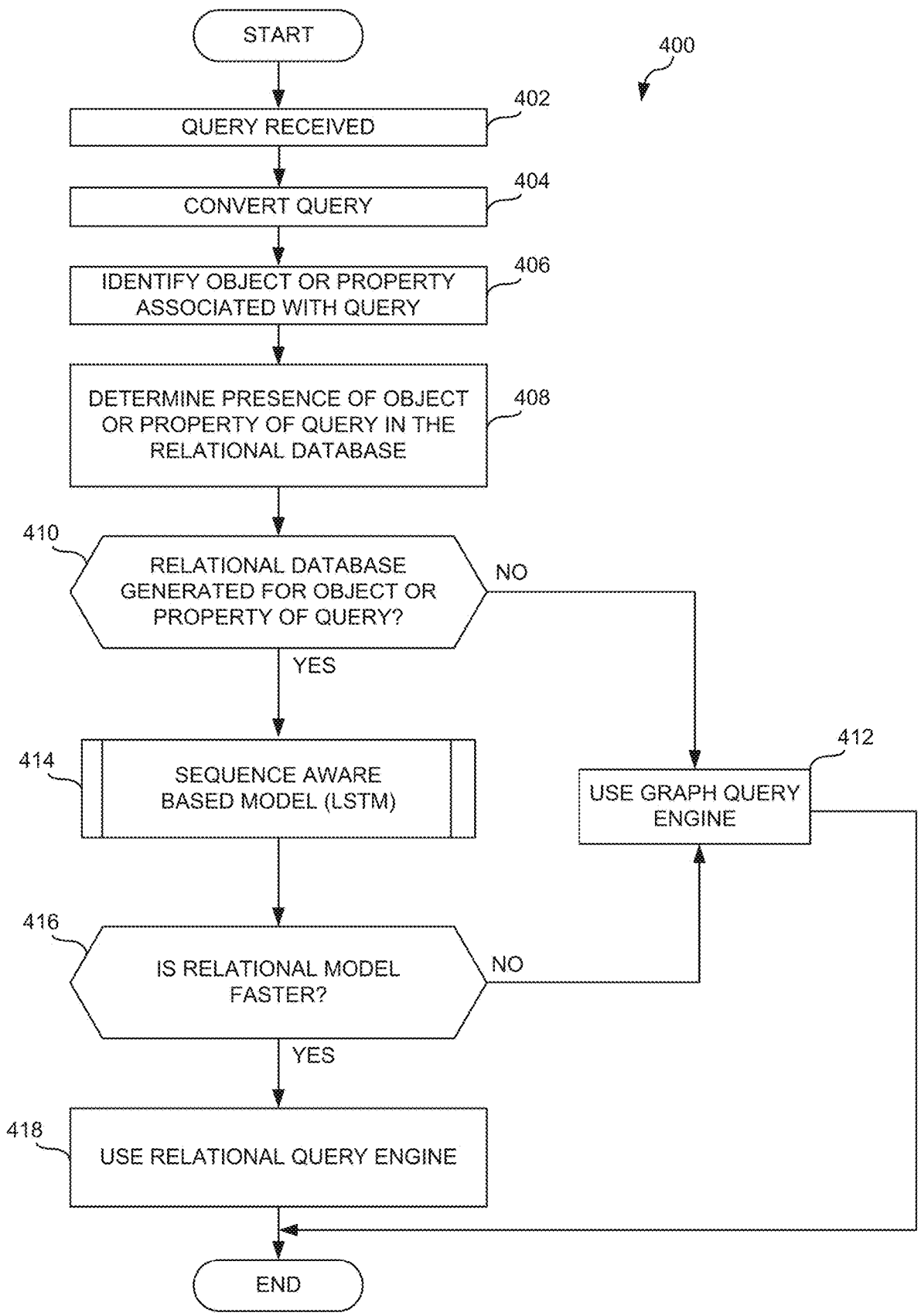
FIG. 4 is a flowchart representative of machine readable instructions which may be executed to implement the example query selection system of FIG. 1.
Figure 5:
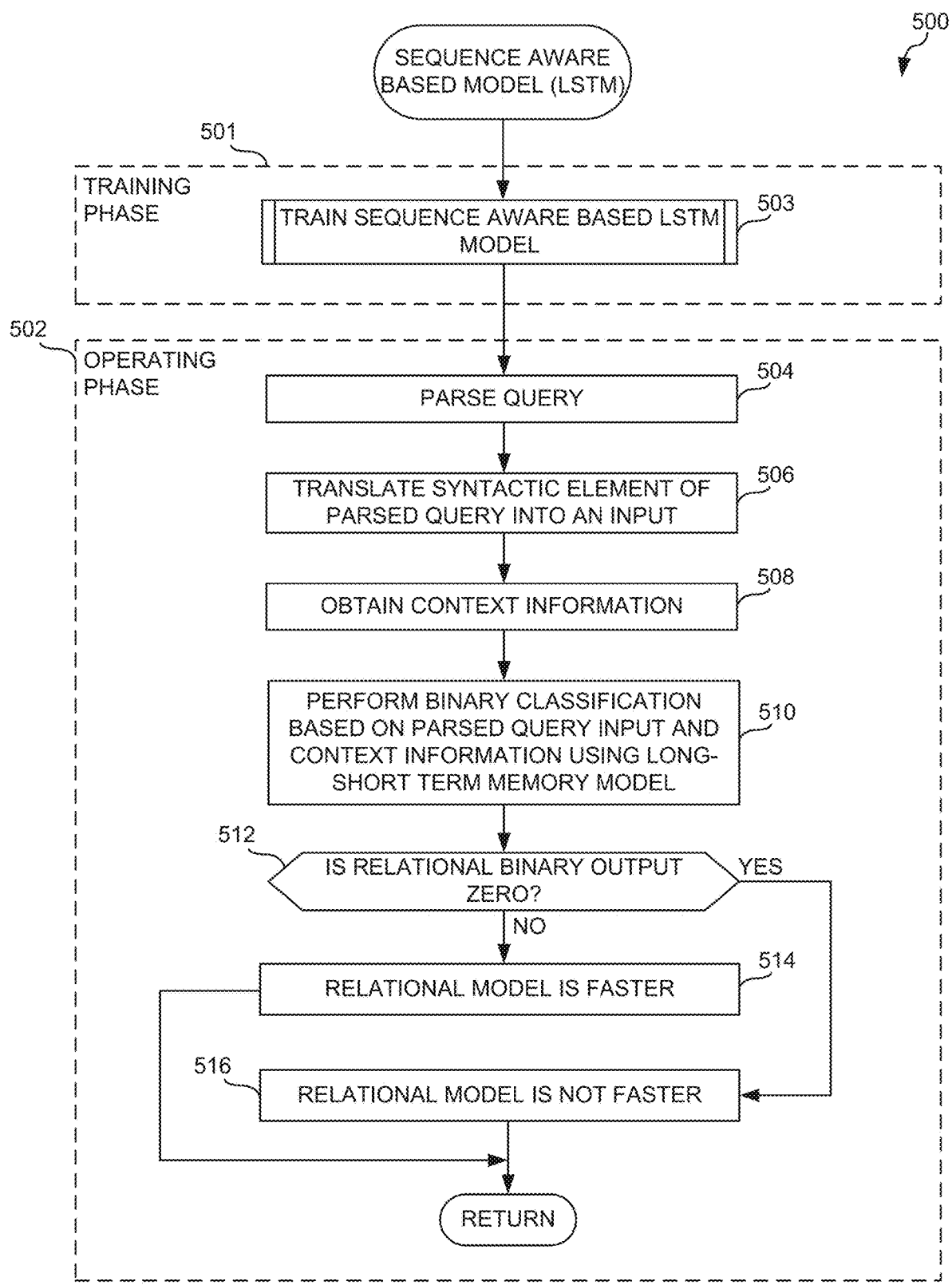
FIG. 5 is a flowchart representative of machine readable instructions which may be executed to implement an example query classifier of the example query selection system of FIG. 1.
Figure 6:
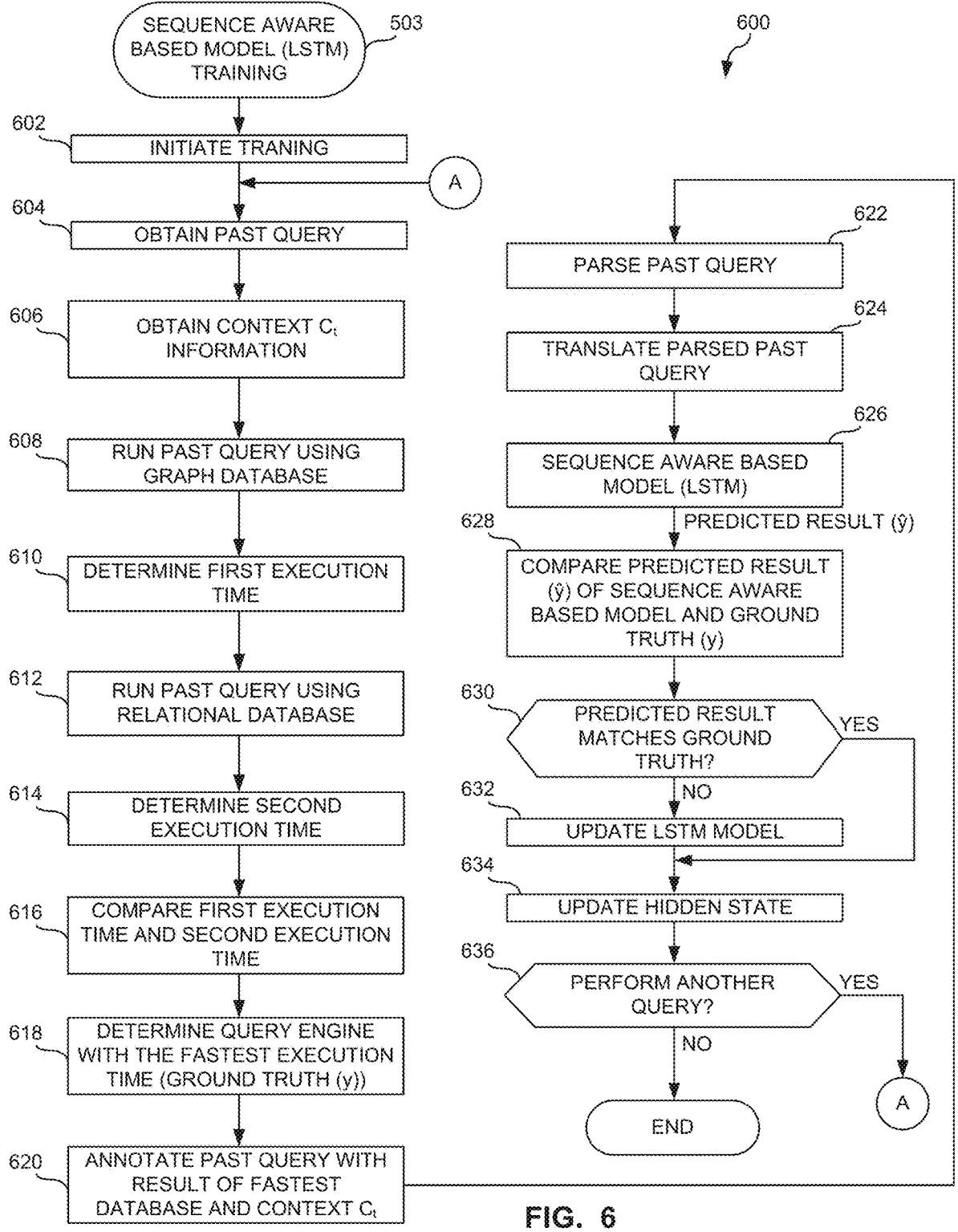
FIG. 6 is a flowchart representative of machine readable instructions which may be executed to implement an example model trainer of the example query selection system of FIG. 1 to train a machine learning model.

Flowcharts representative of example hardware logic, machine readable instructions, hardware implemented state machines, and/or any combination thereof for implementing the query selection system 100 of FIGS. 1, 2 and/or 3 are shown in FIGS. 4, 5, 6 and/or 7. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 4, 5, 6 and/or 7, many other methods of implementing the example query selection system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more compressed formats, encrypted formats, fragmented formats, compiled formats, executable formats, packaged formats, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions which may be executed to implement the example query selection system 100 of FIG. 1. The example process 400 of FIG. 4 begins when the query selection system 100 receives a query (block 402). For example, initialization of the query selection system 100 of FIG. 1 occurs when the graph language query 110 receives the query 115 from the user 111.

The query selection system 100 converts the received query (block 404). For example, the graph language query 110 converts the received query 115 to a language syntax query such as, for example, a function query interface (q).

For example, the graph language query 110 identifies a function of the query 115 and the input arguments (e.g., "name", "Hercules") associated with the identified function. For example, the input arguments can be representative of objects (e.g., a name classification) and properties (e.g., Hercules) of the objects associated with the query 115.

The query selection system 100 identifies one or more objects and/or properties associated with the query (block 406). For example, the query validator 204 of the contextual query classifier 112 identifies the object and/or property of from the function query interface (q).

The query selection system 100 determines if the objects and properties associated with the query 115 (e.g., the functionalized query (q)) are present in the relational database 106 (block 408). For example, the contextual query classifier 112 (e.g., via the query validator 204) compares the objects and/or properties from the query 115 to the list of object tables, objects and/or properties maintained by the hybrid database generator 108 (e.g., via the relational model generator 302).

If the contextual query classifier 112 determines that a relational database 106 is not generated for object or property of the query 115 (block 410 returns a result of NO), the contextual query classifier 112 routes the query 115 to the graph query engine 114 (block 412) and the process 400 ends.

If the contextual query classifier 112 determines that a relational database 106 is generated for the object or property of the query 115 (block 410 returns a result of YES), the contextual query classifier 112 determines an optimal query engine for the query 115 (block 414). For example, the model classifier 210 receives the embedded query (q*) from the vector converter 208 and the context $C_t$ information from the context determiner 218 and processes the input information using the Long-Short Term Memory (LSTM) model classifier to predict which search engine (e.g., the graph query engine 114 or the relational query engine 116) provides the most efficient or optimal performance for executing the query 115. For example, the embedded query (q*) is stacked with the context $C_t$ information and provided as inputs to the LSTM model classifier. This approach leverages current and previous states of the query selection system 100 and performs a context-aware classification, predicting the fastest or optimal search engine for a given query and context $C_t$.

If the contextual query classifier 112 determines that the relational model is not faster (block 416 returns a result of NO), the contextual query classifier 112 routes the query 115 to the graph query engine 114 for processing or executing the query 115 using the graph database 104, and the process 400 ends If the contextual query classifier 112 determines that the relational model is faster (block 416 returns a result of YES), the contextual query classifier 112 routes the query 115 to the relational query engine 116 for processing or executing the query 115 using the relational database 106, and the process 400 ends.

FIG. 5 is a flowchart representative of machine readable instructions which may be executed to implement the model classifier 210 (e.g., the sequence aware based model (e.g., a LSTM model) of the example query selection system of FIGS. 1 and 2. The example process 500 of FIG. 5 includes a training phase 501 and an operational phase 502. The model classifier 210 of the query selection system 100 enters the training phase 501, where the example model trainer 212 trains a machine learning model. (block 503). An example process for training the machine learning model is described below in connection with the illustrated example of FIG. 6. A machine learning model is trained to predict an optimal search engine for a received query based on a context $C_t$ information of the query selection system 100 when executing the query.

Once training is complete, the model classifier 210 enters the operational phase 502. When the contextual query classifier 112 receives the query 115 (or the function query interface (q)) from the graph language query 110, the query parser 202 parses the query 115 (or the function query interface (q)) and provides a parsed query (q') (block 504). The vector converter 208 converts the parsed query (q') into an embedded query (q*) (e.g., a vector array) for use as an input for the model classifier 210 (bock 506). The context determiner 218 determines the context $C_t$ information and provides the context information for use as input for the model classifier 210 (block 508). The model classifier 210 performs a binary classification based on the parsed query (q') and the context $C_t$ information using a Long-Short Term Memory (LSTM) model (block 510). Specifically, the model classifier 210 performs a binary classification for selecting an optimal (e.g., the best or fastest) database engine for running or executing the query 115. The LSTM's hidden state considers the effect past queries have and historical context information. Specifically, the model classifier 210 predicts a binary output (e.g., the output $ŷ=\{0, 1\}$). If the model classifier 210 predicts that a relational binary output is zero (block 512 returns a result of NO), the model classifier 210 determines that the relational model is faster 514 (e.g., the relational model is optimum or faster for executing the query 115). If the model classifier 210 predicts that a relational binary output is zero (block 512 returns a result of YES), the model classifier 210 determines that the relational model is not faster (block 516) (e.g., the graph model is optimum or faster for executing the query 115).

FIG. 6 is a flowchart representative of machine readable instructions which may be executed to implement an example model trainer 212 of the example query selection system of FIG. 1 to train a machine learning model (e.g., a LS™ model). The process 600 implements the train sequence aware based LSTM model (block 503) of FIG. 5. The model trainer 212, via the machine learning model trainer processor 214, initiates training of the model classifier 210 (block 602). For example, the model trainer 212 initiates training of the model classifier 210 in response to detection that the query selection system 100 is off-line, a threshold number of queries are stored in the query datastore 220, a training schedule is initiated, etc.

During training, the model trainer 212 retrieves or obtains past queries stored in the query datastore 220 (block 604). For example, the model trainer 212 retrieves a batch of past queries to be processed during a first training period.

The model trainer 212 retrieves or otherwise receives context $C_t$ information of the query selection system 100 (block 606).

After determining or recording the $C_t$ information, the model trainer 212 executes a past query using the graph database 104 (block 608). The model trainer 212 executes a past query using the graph database 104 at block 608 to establish a ground truth for comparing to the predicted result of the LSTM model. For example, the model trainer 212 employs the graph query engine 114 to execute respective ones of the retrieved past queries via graph database 104. The model trainer 212, via a timer, determines or records a first execution time for the respective ones of the retrieved past queries (block 610). For example, the model trainer 212 determines or records first execution times for all the respective ones of the retrieved past queries executed by the graph query engine 114. Additionally, the model trainer 212 executes the past query using the relational database 106 (block 612). For example, the model trainer 212 employs the relational query engine 116 to execute respective ones of the retrieved past queries via relational database 106. The model trainer 212, via the timer, determines or records a second execution time for the past query (block 614). For example, the model trainer 212 determines or records second execution times for all the respective ones of the retrieved past queries executed by the relational query engine 116.

After the past query is executed on the graph database 104 and the relational database 106, the model trainer 212 compares (e.g., via a comparator) the first execution time and the second execution time (block 616) and determines the query engine that resulted in the fastest execution time (block 618). For example, the model trainer 212 determines, analyzes or compares (e.g., via a comparator) the first execution time and the second execution time to determine the query engine that resulted in the fastest execution time. In this manner, the model trainer 212 establishes a ground truth (e.g., the binary output (y) noted above) for comparing to the predicted result of the LSTM model. The model trainer 212 annotates the past query with the result of the query engine executed the past query in the fastest amount of time (block 620).

The query parser 202 parses the annotated past query (block 622). The vector converter 208 translates or converts (e.g., via Word2Vec) the annotated parsed past query for processing by the LSTM model (block 624). The LSTM model receives and processes the converted annotated parsed past query and the $C_t$ information in the model (block 626) (e.g., via the training procedure noted above). At block 626, the annotated parsed past query and the $C_t$ information are employed to train the LS™ model to predict a database engine to be used (e.g., the predicted output (ŷ)).

The model verifier 216 verifies or compares the predicted result (ŷ) to the ground truth (y) (block 628) to determine if the predicted result matches the ground truth (block 630). If the model verifier 216 determines that the predicted result (ŷ) does not match the ground truth (y) (block 630 returns a result of NO), the model verifier 216 instructs the model trainer 212 to update the LSTM model (block 632). For example, the model verifier 216 uses the difference between the predicted result (ŷ) and the ground truth (y) to back propagate and adjust one or more parameters (e.g., weights) of the LSTM model. Additionally, after each evaluation (at block 630 and 632) (e.g., block 630 returns a result of yes), the LSTM model updates the hidden state (block 634).

After the LSTM model is updated, the model trainer 212 determines whether to perform another query (block 636). If the model trainer 212 determines to perform another query (block 636 returns a result of YES), the process 600 returns to block 604. For example, the model trainer 212 determines that performance of another query is needed when one or more past queries in the batch of queries slated for training have yet to be processed, a training schedule time window has not yet ended, the query selection system 100 has not received a query (e.g., from the user 111), etc. If the model trainer 212 determines not to perform another query (block 636 returns a result of NO), the process 600 ends. For example, the model trainer 212 determines that performance of another query is not needed when the batch of queries slated for training have all been processed, a training schedule time window has ended, the query selection system 100 receives a query (e.g., from the user 111), etc.

Figure 7:
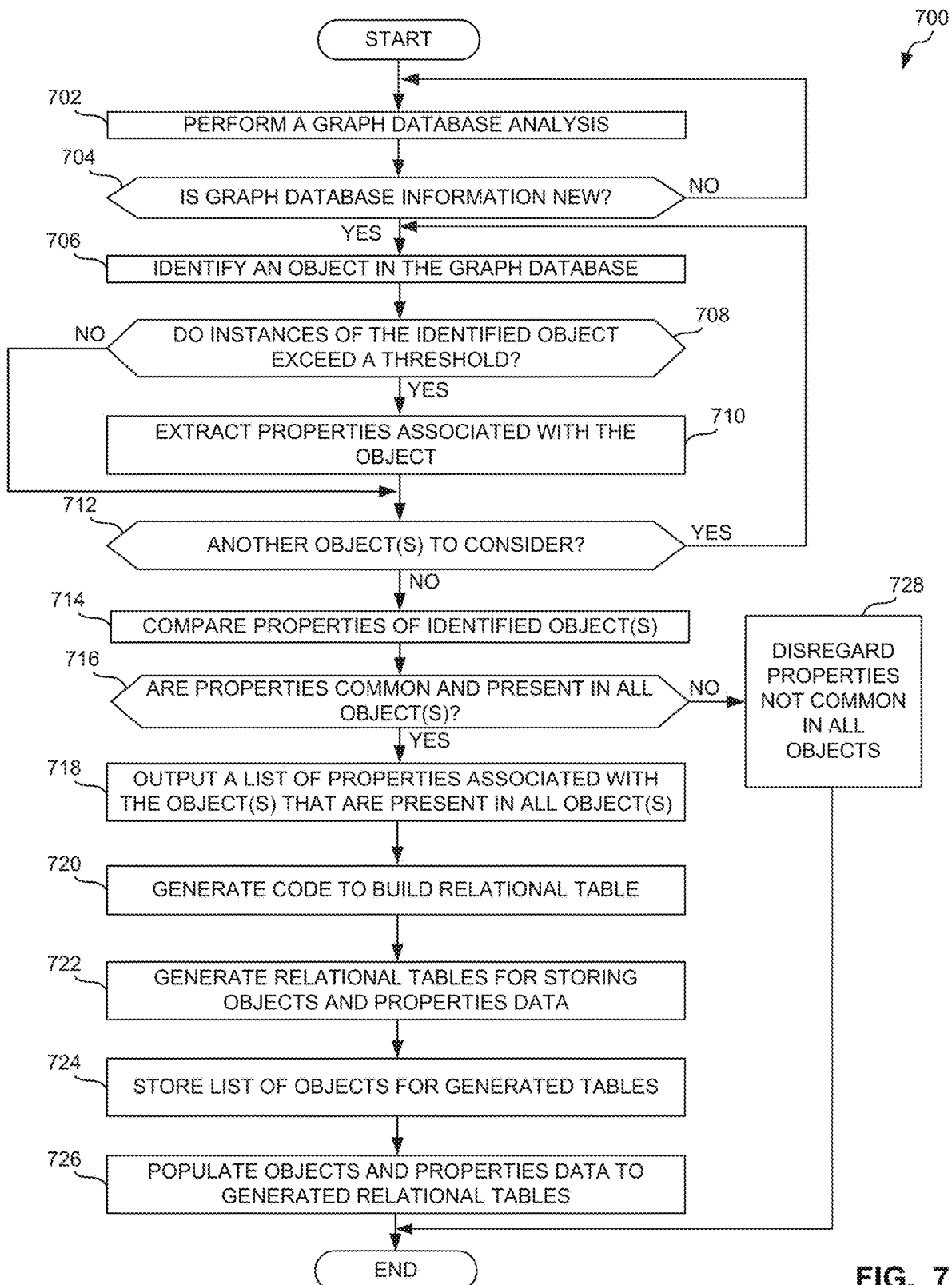
FIG. 7 is a flowchart representative of machine readable instructions which may be executed to construct an example relational database of the example query selection system of FIG. 1 from information obtained from a graph database.

FIG. 7 is a flowchart representative of machine readable instructions which may be executed by the hybrid database generator 108 to generate the example relational database 106 of the example query selection system 100 of FIG. 1 from information obtained from the graph database 104. The object and property analyzer 304 performs a graph database analysis (block 702). In some examples, the object and property analyzer 304 analyzes information or data in the graph database 104 periodically. In some examples, the object and property analyzer 304 analyzes information or data in the graph database 104 when new information is written to the graph database 104.

The object and property analyzer 304 identifies new information in the graph database 104 (block 704). If the object and property analyzer 304 does not identify new information in the graph database (block 704 returns a result of NO), the process 700 returns to block 702. If the object and property analyzer 304 identifies new information in the graph database (block 704 returns a result of YES), the object and property analyzer 304 identifies an object in the graph database 104 (block 706). After identifying the object in the graph database 104, the object and property analyzer 304 determines if a number of instances of the object reflected in the graph database 104 exceeds a threshold (block 708). For example, the object and property analyzer 304 compares a number of instances of the identified object to a threshold (e.g., a value, a percentage, 10 times, 100 times, etc.). If the object and property analyzer 304 determines that the identified object exceeds the threshold (block 708 returns a result of YES), the object and property analyzer 304 extracts properties from the graph database 104 associated with the identified object (block 710).

If the object and property analyzer 304 determines that the identified object does not exceed the threshold (block 708 returns a result of NO), the object and property analyzer 304 determines if there is another object to consider in the graph database 104 (block 712). If the object and property analyzer 304 identifies another object to consider (block 712 returns a result of YES), the process 700 returns to block 706. If the object and property analyzer 304 does not identify another object to consider (block 712 returns a result of NO), the object and property analyzer 304 compares the properties of the identified object(s) (block 714). The object and property analyzer 304 compares one or more properties to detect which properties that are common and present in all object (s) identified (block 716). If the object and property analyzer 304 determines that one or more properties are not common in all objects (block 716 returns a result of NO), the object and property analyzer 304 discards the non-common properties (block 728).

If the object and property analyzer 304 determines that one or more properties are common in all objects (block 716 returns a result of YES), the object and property analyzer 304 outputs a list of properties associated with the object(s) that are present in all object(s) (block 718).

The relational model generator 302 generates code to build one or more relational tables for storing the objects and the properties identified in the list of objects and properties output by the object and property analyzer 304 (block 720). After the relational model generator 302 generates the code to build the relational tables, the relational model generator 302 generates relational tables for storing the objects and properties data identified by the object and property analyzer 304 (block 722). Additionally, the relational model generator 302 stores a list of objects for the generated tables (block 724). The table populator 306 populates the objects and properties from the graph database 104 in the generated relational tables generated by the relational model generator 302 to generate the relational database 106 (block 726).

Figure 10:
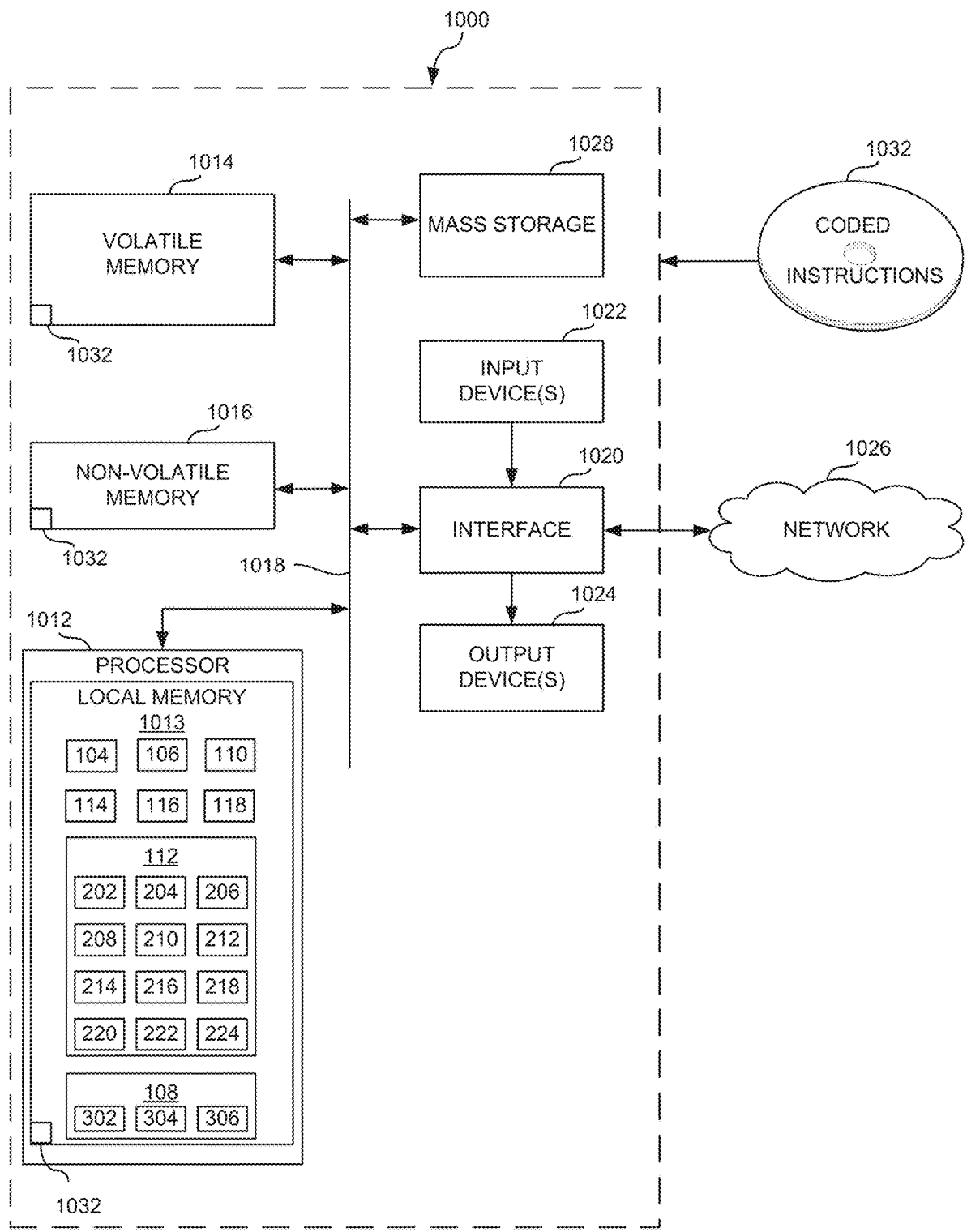
FIG. 10 is a block diagram of an example processing platform structured to execute the instructions of FIGS. 4-7 to implement the example query selection system of FIG. 1.

FIG. 10 is a block diagram of an example processor platform 1000 structured to execute the instructions of FIGS. 4, 5, 6, and/or 7 to implement the query selection system 100 of FIGS. 1, 2 and/or 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example hybrid database 102, the graph database 104, the example relational database 106, the example hybrid database generator 108, the example graph language query 110, the example contextual query classifier 112, the example graph query engine 114, the example relational query engine 116, the example storage 118, the example query parser 202, the example query validator 204, the example query tracker 206, the example vector converter 208, the example model classifier 210, the example model trainer 212, the example machine learning model trainer processor 214, the example model verifier 216, the example context determiner 218, the example query datastore 220, the example model datastore 222, the example relational model generator 302, the example object and property analyzer 304, the example table populator 306 and/or, more generally, the example query selection system 100 of FIGS. 1-3.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device (s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In some example, the mass storage device 1028 implements the example graph database 104 and/or the example relational database 106.

The machine executable instructions 1032 of FIGS. 4, 5, 6 and/or 7 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed generate a relational database based on certain data obtained from a graph database and to predict and/or select a database that provides faster more efficient results (e.g., optimum query performance) The disclosed methods, apparatus and articles of manufacture improve the efficiency of using a computing device by improving execution of a query. The disclosed methods, apparatus and articles of manufacture are accordingly directed to one or more improvement(s) in the functioning of a computer.

Further examples and combinations thereof include the following:

Example 1 includes a system having a processor to: analyze a graph database; identify respective ones of objects associated with the graph database; obtain properties associated with the objects; identify common properties present in the respective ones of the objects; in response to determining the common properties present in the identified objects, output a list of the common properties corresponding to the respective ones of the objects; generate a table for the common properties and the respective ones of the objects; and populate the table with the common properties and the respective ones of the objects from the graph database to establish a relational database. The system further includes a machine learning model classifier to enable relational database query searching via the relational database.

Example 2 includes the system of example 1, wherein to obtain properties associated with the objects, the processor is to: determine if the respective ones of the objects satisfy a threshold; and in response to the respective ones of the objects satisfying the threshold, obtain properties associated with the objects.

Example 3 includes the system of any one of examples 1-2 wherein, to determine if the respective ones of the objects satisfy a threshold, the processor is to: determine a number of instances of the respective ones of the objects present in the graph database; and compare the number of instances and the threshold.

Example 4 includes the system of any one of examples 1-3, wherein the processor is to store the objects in a list format in memory.

Example 5 includes the system of any one of examples 1-4, wherein the machine learning model classifier is to predict whether a query performance is faster using a graph query engine associated with the graph database or a relational query engine associated with the relational database.

Example 6 includes the system of any one of examples 1-5, wherein the machine learning model classifier employs an artificial intelligence architecture to predict the query performance.

Example 7 includes the system of any one of examples 1-6, wherein the processor is to use the relational database in response to the artificial intelligence architecture predicting the query performance being faster using the relational query engine than the graph query engine.

Example 8 includes the system of any one of examples 1-7, wherein the machine learning model classifier includes a sequenced aware and context aware binary classification model based on a Long-short Term Memory model.

Example 9 includes the system of any one of examples 1-8, further including a model trainer to train the machine learning model classifier to predict query performance by employing past queries received by the query selection system and context information of the query selection system.

Example 10 includes a non-transitory computer readable storage medium comprising instructions which, when executed, cause a machine to analyze a graph database; identify respective ones of objects associated with the graph database; obtain properties associated with the objects; identify common properties present in the respective ones of the objects; in response to determining the common properties present in the identified objects, output a list of the common properties corresponding to the respective ones of the objects; generate a table for the common properties and the respective ones of the objects; populate the table with the common properties and the respective ones of the objects from the graph database to establish a relational database; and enable relational database query searching via the relational database.

Example 11 includes the computer readable storage medium of example 10, wherein to obtain properties associated with the objects, the instructions cause the machine to: determine if the respective ones of the objects satisfy a threshold; and in response to the respective ones of the objects satisfying the threshold, obtain properties associated with the objects.

Example 12 includes the computer readable storage medium of any one of examples 10-11, wherein the instructions cause the machine to: determine if the respective ones of the objects satisfy a threshold; and determine a number of instances of the respective ones of the objects present in the graph database and compare the number of instances and the threshold.

Example 13 includes the computer readable storage medium of any one of examples 10-12, wherein the instructions cause the machine to store the list objects in memory.

Example 14 includes the computer readable storage medium of any one of examples 10-13, wherein the instructions cause the machine to predict whether a query performance is faster using a graph query engine associated with the graph database or a relational query engine associated with the relational database.

Example 15 includes the computer readable storage medium of any one of examples 10-14, wherein the instructions cause the machine to use the relational database in response to the artificial intelligence architecture predicting the query performance being faster using the relational query engine than the graph query engine.

Example 16 includes the computer readable storage medium of any one of examples 10-15, wherein the instructions cause the machine to train the machine learning model classifier to predict query performance by employing past queries received by the query selection system and context information of the query selection system.

Example 17 includes a method including analyzing a graph database; identifying respective ones of objects associated with the graph database; obtaining properties associated with the objects; identifying common properties present in the respective ones of the objects; in response to determining the common properties present in the identified objects, outputting a list of the common properties corresponding to the respective ones of the objects; generating a table for the common properties and the respective ones of the objects; populating the table with the common properties and the respective ones of the objects from the graph database to establish a relational database; and enabling relational database query searching via the relational database.

Example 18 includes the method of example 17, wherein to obtain properties associated with the objects, the method includes: determining if the respective ones of the objects satisfy a threshold; and in response to the respective ones of the objects satisfying the threshold, obtaining properties associated with the objects.

Example 19 includes the method of any one of examples 17-18, wherein determining if the respective ones of the objects satisfy the threshold includes: determining a number of instances of the respective ones of the objects present in the graph database; and comparing the number of instances and the threshold.

Example 20 includes the method of any one of examples 17-19, further including storing the list objects in memory.

Example 21 includes the method of any one of examples 17-20, further including predicting whether a query performance is faster using a graph query engine associated with the graph database or a relational query engine associated with the relational database.

Example 22 includes the method of any one of examples 17-21, further including using the relational database in response to predicting query performance being faster using the relational query engine than the graph query engine.

Example 23 includes the method of any one of examples 17-22, further including training a machine learning model classifier to predict query performance by employing past queries received by the query selection system and context information of the query selection system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A query selection system, comprising:
memory;
instructions; and
at least one processor to execute the instructions to at least:
    generate a relational database based on a list of first properties respectively present in one or more objects associated with a graph database;
    train a machine learning model to select one of the graph database or the relational database for processing a query, the selection based on a query performance predicted for the one of the graph database or the relational database, the training of the machine learning model to include:
        determining a first result based on evaluation of a training query using the graph database and the relational database;
        determining a second result based on evaluation of the training query using the machine learning model; and
        adjusting weights of the machine learning model based on execution of a cross-entropy loss function, the first result and the second result provided as input to the cross-entropy loss function;
    execute the trained machine learning model based on the query to output a value indicative of a selected one of the graph database or the relational database; and
    route the query to a query engine corresponding to the selected one of the graph database or the relational database, the query engine to process the query using the selected one of the graph database or the relational database.

2. The system of claim 1, wherein the at least one processor is to execute the instructions to:
    determine if a first one of the one or more objects satisfies a threshold; and
    in response to the first one of the one or more objects satisfying the threshold, obtain the first and second properties associated with the first one of the one or more objects.

3. The system of claim 2, wherein to determine if the first one of the one or more objects satisfies the threshold, the at least one processor is to execute the instructions to:
    determine a number of instances of the first one of the one or more objects present in the graph database; and
    compare the number of instances and the threshold.

4. The system of claim 1, wherein the at least one processor is to execute the instructions to store the one or more objects of the list in a list format in the memory.

5. The system of claim 1, wherein the at least one processor is to execute the instructions to predict whether the query performance is faster using a graph query engine associated with the graph database or a relational query engine associated with the relational database.

6. The system of claim 5, wherein the at least one processor is to use the relational database to process the query in response to predicting that the query performance is faster using the relational query engine.

7. The system of claim 5, wherein the machine learning model is a sequenced aware and context aware binary classification model based on a Long Short-Term Memory model.

8. The system of claim 5, wherein the at least one processor is to execute the instructions to predict the query performance by employing past queries received by the query selection system and context information of the query selection system.

9. The system of claim 1, wherein the at least one processor is to execute the instructions to:
   receive the query via a graph query engine associated with the graph database;
   identify one or more second objects or one or more third properties associated with the query;
   determine whether the one or more second objects or the one or more third properties associated with the query are present in the relational database; and
   in response to determining that the one or more second objects or the one or more third properties associated with the query are not present in the relational database, route the query to the graph query engine for performance of the query.

10. The system of claim 9, further including, in response to determining that the one or more second objects or the one or more third properties associated with the query are present in the relational database, predicting whether the query performance is faster using the graph query engine associated with the graph database or a relational query engine associated with the relational database.

11. The system of claim 1, wherein the machine learning model is trained based on (a) a first engine load of a graph query engine associated with the graph database and (b) a second engine load of a relational query engine associated with the relational database.

12. A non-transitory computer readable storage medium comprising instructions to cause a machine to at least:
   generate a relational database based on a list of first properties respectively present in one or more objects associated with a graph database;
   train a machine learning model to select one of the graph database or the relational database for processing a query, the selection based on a query performance predicted for the one of the graph database or the relational database, the training of the machine learning model to include:
      determining a first result based on evaluation of a training query using the graph database and the relational database;
      determining a second result based on evaluation of the training query using the machine learning model; and
      adjusting weights of the machine learning model based on execution of a cross-entropy loss function, the first result and the second result provided as input to the cross-entropy loss function;
   execute the trained machine learning model based on the query to output a value indicative of a selected one of the graph database or the relational database; and
   route the query to a query engine corresponding to the selected one of the graph database or the relational database, the query engine to process the query using the selected one of the graph database or the relational database.

13. The non-transitory computer readable storage medium of claim 12, wherein the instructions cause the machine to:
   determine if a first one of the one or more objects satisfies a threshold; and
   in response to the first one of the one or more objects satisfying the threshold, obtain the first and second properties associated with the first one of the one or more objects.

14. The non-transitory computer readable storage medium of claim 13, wherein to determine if the first one of the one or more objects satisfies the threshold, the instructions cause the machine to:
   determine a number of instances of the first one of the one or more objects present in the graph database; and
   compare the number of instances and the threshold.

15. The non-transitory computer readable storage medium of claim 12, wherein the instructions cause the machine to store the one or more objects of the list in a list format in memory.

16. The non-transitory computer readable storage medium of claim 12, wherein the instructions cause the machine to predict whether the query performance is faster using a graph query engine associated with the graph database or a relational query engine associated with the relational database.

17. The non-transitory computer readable storage medium of claim 16, wherein the instructions cause the machine to use the relational database to process the query in response to predicting that the query performance is faster using the relational query engine.

18. The non-transitory computer readable storage medium of claim 16, wherein the instructions cause the machine to predict the query performance by employing past queries received by the machine and context information of the machine.

19. A method to provide query selection, the method comprising:
   generating a relational database based on a list of first properties respectively present in one or more objects associated with a graph database;
   training a machine learning model to select one of the graph database or the relational database for processing a query, the selection based on a query performance predicted for the one of the graph database or the relational database, the training of the machine learning model to include:
      determining a first result based on evaluation of a training query using the graph database and the relational database;
      determining a second result based on evaluation of the training query using the machine learning model; and
      adjusting weights of the machine learning model based on execution of a cross-entropy loss function, the first result and the second result provided as input to the cross-entropy loss function;
   executing the trained machine learning model based on the query to output a value indicative of a selected one of the graph database or the relational database; and
   routing the query to a query engine corresponding to the selected one of the graph database or the relational database, the query engine to process the query using the selected one of the graph database or the relational database.

20. The method of claim 19, further including:
   determining if a first one of the one or more objects satisfies a threshold; and
   in response to the first one of the one or more objects satisfying the threshold, obtaining the first and second properties associated with the first one of the one or more objects.

21. The method of claim 20, wherein determining if the first one of the one or more objects satisfies the threshold includes:

determining a number of instances of the first one of the one or more objects present in the graph database; and comparing the number of instances and the threshold.

22. The method of claim 19, further including storing the one or more objects of the list in a list format in memory.

23. The method of claim 19, further including predicting whether the query performance is faster using a graph query engine associated with the graph database or a relational query engine associated with the relational database.

24. The method of claim 23, further including using the relational database to process the query in response to predicting that the query performance is faster using the relational query engine.

25. The method of claim 23, further including predicting the query performance by employing past queries received by a query selection system and context information of the query selection system.

* * * * *